(12) United States Patent
Lukierski et al.

(10) Patent No.: US 10,796,151 B2
(45) Date of Patent: Oct. 6, 2020

(54) MAPPING A SPACE USING A MULTI-DIRECTIONAL CAMERA

(71) Applicant: IMPERIAL COLLEGE OF SCIENCE, TECHNOLOGY AND MEDICINE, London (GB)

(72) Inventors: Robert Lukierski, London (GB); Stefan Leutenegger, London (GB); Andrew Davison, London (GB)

(73) Assignee: Imperial College of Science, Technology and Medicine, London (GB)

( * ) Notice: Subject to any disclaimer, the term of this patent is extended or adjusted under 35 U.S.C. 154(b) by 110 days.

(21) Appl. No.: 15/906,758

(22) Filed: Feb. 27, 2018

(65) Prior Publication Data

US 2018/0189565 A1 Jul. 5, 2018

Related U.S. Application Data

(63) Continuation of application No. PCT/GB2016/052618, filed on Aug. 23, 2016.

(30) Foreign Application Priority Data

Aug. 28, 2015 (GB) .................................. 1515378.6

(51) Int. Cl.
*G06K 9/00* (2006.01)
*G06T 7/579* (2017.01)
(Continued)

(52) U.S. Cl.
CPC .......... *G06K 9/00664* (2013.01); *A47L 9/009* (2013.01); *B25J 9/1666* (2013.01);
(Continued)

(58) Field of Classification Search
CPC .. G06T 7/579; G06T 7/74; G06T 7/55; G06T 2207/10016; G06T 2207/20228;
(Continued)

(56) References Cited

U.S. PATENT DOCUMENTS 9,571,819 B1 * 2/2017 Barron ................. H04N 13/128
2004/0167667 A1 8/2004 Goncalves et al.
(Continued)

FOREIGN PATENT DOCUMENTS

AU 2015202200 A1 5/2015
EP 2854104 A1 4/2015
(Continued)

OTHER PUBLICATIONS

Engel et al., "LSD_SLAM: Large-Scale Direct Monocular SLAM", 2014, European Conference on Computer Vision, pp. 834-849. (Year: 2014).*

(Continued)

*Primary Examiner* — Brenda C Bernardi
(74) *Attorney, Agent, or Firm* — EIP US LLP

(57) ABSTRACT

Examples described herein relate to mapping a space using a multi-directional camera. This mapping may be performed with a robotic device comprising a monocular multi-directional camera device and at least one movement actuator. The mapping may generate an occupancy map to determine navigable portions of the space. A robotic device movement around a point in a plane of movement may be instructed using the at least one movement actuator. Using the monocular multi-directional camera device, a sequence of images are obtained (610) at different angular positions during the instructed movement. Pose data is determined (620) from the sequence of images. The pose data is determined using features detected within the sequence of images. Depth values are then estimated (630) by evaluating (Continued)

a volumetric function of the sequence of images and the pose data. The depth values are processed (640) to populate the occupancy map for the space.

28 Claims, 7 Drawing Sheets

(51) Int. Cl.
  *G06T 7/55*  (2017.01)
  *G06T 7/73*  (2017.01)
  *A47L 9/00*  (2006.01)
  *B25J 9/16*  (2006.01)
  *B25J 11/00*  (2006.01)
  *G05D 1/02*  (2020.01)
  *H04N 5/232*  (2006.01)
  *G06T 7/80*  (2017.01)

(52) U.S. Cl.
  CPC ......... *B25J 9/1697* (2013.01); *B25J 11/0085* (2013.01); *G05D 1/0212* (2013.01); *G06T 7/55* (2017.01); *G06T 7/579* (2017.01); *G06T 7/74* (2017.01); *H04N 5/23238* (2013.01); *A47L 2201/04* (2013.01); *G06T 7/80* (2017.01); *G06T 2207/10012* (2013.01); *G06T 2207/10016* (2013.01); *G06T 2207/20228* (2013.01); *G06T 2207/30244* (2013.01); *Y10S 901/01* (2013.01); *Y10S 901/47* (2013.01)

(58) Field of Classification Search
  CPC ............. G06T 2207/10012; G06T 7/80; G06T 2207/30244; H04N 5/23238; G06K 9/00664; G05D 1/0212; B25J 11/0085; B25J 9/1697; B25J 9/1666; A47L 9/009; A47L 2201/04; Y10S 901/47; Y10S 901/01
  See application file for complete search history.

(56) References Cited

U.S. PATENT DOCUMENTS

| | | |
|---|---|---|
| 2005/0168616 A1 | 8/2005 | Rastegar et al. |
| 2006/0023105 A1 | 2/2006 | Kostrzewski et al. |
| 2010/0040279 A1 | 2/2010 | Yoon et al. |
| 2011/0043604 A1 | 2/2011 | Peleg et al. |
| 2011/0279685 A1 | 11/2011 | Alahi et al. |
| 2011/0288684 A1* | 11/2011 | Farlow .................. B25J 11/009 700/264 |
| 2012/0121161 A1* | 5/2012 | Eade .................... G09B 29/007 382/153 |
| 2012/0173018 A1* | 7/2012 | Allen ................... G05D 1/0248 700/245 |
| 2012/0182392 A1* | 7/2012 | Kearns .................. B25J 11/009 348/46 |
| 2012/0185094 A1* | 7/2012 | Rosenstein ............ B25J 11/009 700/259 |
| 2012/0185095 A1* | 7/2012 | Rosenstein .............. B25J 5/007 700/259 |
| 2012/0185096 A1* | 7/2012 | Rosenstein ............ B25J 11/009 700/259 |
| 2012/0197439 A1* | 8/2012 | Wang .................... B25J 9/1689 700/259 |
| 2013/0216098 A1 | 8/2013 | Hasegawa et al. |
| 2013/0226344 A1 | 8/2013 | Wong et al. |
| 2014/0003705 A1* | 1/2014 | Taguchi .................. G06T 7/344 382/154 |
| 2014/0037136 A1 | 2/2014 | Ramalingam et al. |
| 2014/0126769 A1 | 5/2014 | Reitmayr et al. |
| 2014/0146132 A1 | 5/2014 | Bagnato et al. |
| 2014/0200713 A1* | 7/2014 | Allen ..................... B25J 11/009 700/253 |
| 2014/0207286 A1* | 7/2014 | Wang .................... B25J 9/1689 700/259 |
| 2014/0249676 A1* | 9/2014 | Florencio ............... B25J 9/1694 700/259 |
| 2014/0267594 A1 | 9/2014 | Furumura et al. |
| 2014/0285486 A1 | 9/2014 | Chang et al. |
| 2014/0320593 A1 | 10/2014 | Pirchheim et al. |
| 2014/0324249 A1 | 10/2014 | Lacaze et al. |
| 2014/0350839 A1 | 11/2014 | Pack et al. |
| 2014/0362192 A1 | 12/2014 | Lin et al. |
| 2015/0043827 A1 | 2/2015 | Hara |
| 2015/0073598 A1* | 3/2015 | Rosenstein ............. B25J 5/007 700/264 |
| 2015/0375396 A1* | 12/2015 | Shirakyan ............. B25J 9/1697 700/254 |
| 2016/0012588 A1* | 1/2016 | Taguchi ............... H04N 17/002 348/46 |
| 2016/0027207 A1* | 1/2016 | Hillen ..................... G06T 17/00 348/207.1 |
| 2016/0059420 A1* | 3/2016 | Ji .............................. B25J 5/00 348/148 |
| 2016/0059770 A1* | 3/2016 | Ji ............................ B60Q 1/24 348/159 |
| 2016/0089791 A1* | 3/2016 | Bradski .................... B25J 9/163 700/214 |
| 2016/0271798 A1* | 9/2016 | Dooley ................. B25J 9/1658 |
| 2016/0339587 A1* | 11/2016 | Rublee .................. B25J 9/1697 |
| 2017/0285651 A1* | 10/2017 | Ji ........................ G05D 1/0246 |
| 2018/0085927 A1* | 3/2018 | Kapoor .................. B25J 9/1697 |
| 2019/0234746 A1* | 8/2019 | Zhang ..................... G06K 9/00 |

FOREIGN PATENT DOCUMENTS

| | | |
|---|---|---|
| JP | 200285305 A | 3/2002 |
| JP | 2004122326 A | 4/2004 |
| JP | 200654838 A | 2/2006 |
| JP | 2009169845 A | 7/2009 |
| JP | 201044740 A | 2/2010 |
| JP | 2014222550 A | 11/2014 |
| JP | 201536629 A | 2/2015 |
| WO | 2012040644 A1 | 3/2012 |
| WO | 2014033731 A1 | 3/2014 |
| WO | 2014060657 A1 | 4/2014 |
| WO | 2015043872 A1 | 4/2015 |

OTHER PUBLICATIONS

Pau Gargallo et al. An Occupancy-Depth Generative Model of Multi-view Images. Nov. 18, 2007. Computer Vision—ACCV 2007; [Lecture Notes in Computer Science], Springer Berlin, Heidelberg, Belrin, pp. 373-383, XP019082482.
Jacek Zienkiewicz et al. Dense, Auto-Calibrating Visual Odometry from a Downward-Looking Camera. Proceedings of the British Machine Vision Conference 2013. Jan. 1, 2013, pp. 91. 1-94.11, XP055319215.
Japanese Office Action dated Jul. 8, 2019 for Japanese Application No. 2018-529746.
Newcombe et al., "DTAM: Dense Tracking and Mapping in Real-Time", 2011 International Conference on Computer Vision, USA, Nov. 6, 2011, pp. 2320-2327, URL, https://ieeexplore.ieee.org/stamp/stamp.jsp?tp=&arnumber=6126513.
Shops et al., "Semi-dense visual odometry for AR on a smartphone", 2014IEEE, International Symposium on Mixed and Augmented Reality (ISMAR), USA, Sep. 10, 2014, URL, https://ieeexplore.ieee.org/stamp/stamp.jsp?tp=&arnumber=6948420 (Publication showing well-known technology).
Rosten et al., "Machine learning for highspeed corner detection", Proceedings of the European Conference on Computer Vision (ECCV), 2006.
Lowe, D. G., "Distinctive image features from scale invariant keypoints" in the International Journal of Computer Vision (IJCV), 60(2):91-110, 2004.
Triggs et al., "Bundle adjustment—a modern synthesis", Vision algorithms: theory and practice, Springer Berlin Heidelberg, 2000, 298-372.

(56) References Cited

OTHER PUBLICATIONS

Schops et al., "Semi-dense visual odometry for AR on a smartphone", 2014IEEE, International Symposium on Mixed and Augmented Reality (ISMAR), USA, Sep. 10, 2014, URL, https://ieeexplore.ieee.org/stamp/stamp.jsp?tp=&arnumber=6948420 (Publication showing well-known technology).

Japanese Office Action dated Feb. 17, 2020 for JP Application No. 2018-529746.

Okawa et al., "Simultaneous Localization and Mapping Problem via H∞ Filter Considering Finite Escape Time", Collection of Papers of the Society of Instrument and Control Engineers, vol. 48, No. 10, Japan, The Society of Instrument and Control Engineers, 2012.

Shimizu et al., "Visual Navigation from Uncalibrated Stereo Pointer", Research Report of Information Processing Society of Japan, vol. 99, No. 55, Japan, Information Processing Society of Japan, Jul. 15, 1999, pp. 9-16.

\* cited by examiner

MAPPING A SPACE USING A MULTI-DIRECTIONAL CAMERA

CROSS-REFERENCE TO RELATED APPLICATIONS

This application is a continuation of International Patent Application No. PCT/GB2016/052618, which was filed on Aug. 23, 2016, and claims priority to GB Application No. 1515378.6, which was filed on Aug. 28, 2015. Applicant hereby incorporates the contents of these applications by reference in their entireties.

BACKGROUND OF THE INVENTION

Field of the Invention

The present invention relates to mapping a space using a multi-directional camera. The invention has particular, but not exclusive, relevance to generating an occupancy map based on a sequence of images from a monocular multi-directional camera that are captured during movement of the camera.

Description of the Related Technology

Low cost robotic devices, such as floor cleaning robots, generally rely on limited perception and simple algorithms to navigate a three-dimensional space, such as an interior room. For example, in one case a robotic device may comprise an infra-red or ultrasonic sensor that detects objects within a line of site that may then be avoided. While great progress has been made around techniques such as simultaneous localisation and mapping (SLAM), many of the solutions rely on the substantial computational resources that are available to research laboratories. This makes it difficult to translate these solutions to the embedded computing devices that control real-world commercial robotic devices. Additionally, certain solutions require a suite of specialised sensor devices such as LAser Detection And Ranging—LADAR—sensors, structured light sensors, or time-of-flight depth cameras. These specialised sensor devices add expense and complexity that makes them less suitable for real-world robotic applications.

US2010/0040279A1 describes a method and apparatus to build a three-dimensional grid map to control an automatic traveling apparatus. In building the three-dimensional map to discern a current location and a peripheral environment of an unmanned vehicle or a mobile robot, two-dimensional localization and three-dimensional image restoration are used to accurately build the three-dimensional grid map more rapidly. However, this solution requires the use of a stereo omni-directional camera comprising at least two individual omni-directional camera devices and corresponding stereo image processing. This may not be practical or cost-effective for many domestic or low-cost robotic devices.

US2014/0037136A1 describes a method and system for determining poses of vehicle-mounted cameras for in-road obstacle detection. Poses of a movable camera relative to an environment are obtained by determining point correspondences from a set of initial images and then applying two-point motion estimation to the point correspondences to determine a set of initial poses of the camera. A point cloud is generated from the set of initial poses and the point correspondences. Then, for each next image, the point correspondences and corresponding poses are determined, while updating the point cloud. The point cloud may be used to detect obstacles in the environment of a motor vehicle. However, the techniques described therein are more appropriate for larger devices such as cars and other motor vehicles that have access to engine-driven power supplies and that can employ larger, higher-specification computing resources. This may not be practical or cost-effective for many domestic or low-cost robotic devices.

US2013/0216098A1 describes a technique for constructing a map of a crowded three-dimensional space, e.g. environments with lots of people. It includes a successive image acquisition unit that obtains images that are taken while a robot is moving, a local feature quantity extraction unit that extracts a quantity at each feature point from the images, a feature quantity matching unit that performs matching among the quantities in the input images, where quantities are extracted by the extraction unit, an invariant feature quantity calculation unit that calculates an average of the matched quantities among a predetermined number of images by the matching unit as an invariant feature quantity, a distance information acquisition unit that calculates distance information corresponding to each invariant feature quantity based on a position of the robot at times when the images are obtained, and a map generation unit that generates a local metrical map as a hybrid map. While this technique has advantages when used in crowded spaces, it is less appropriate for employment in embedded computing devices with limited computing resources.

EP2854104A1 describes a method for semi-dense simultaneous localization and mapping. In this method, a pose of an image acquisition means and depth information is estimated. Steps of tracking a position and/or orientation of the image acquisition means and mapping by determining depth information are interleaved. The depth information is determined for only a subset of the image pixels, for instance for those pixels for which the intensity variation is sufficiently high.

While the aforementioned techniques have certain advantages for particular situations, they are often complex and require intensive computation. This makes these techniques difficult to implement on an embedded controller of, for example, a small low-cost domestic robotic device. As such there is a desire for control techniques that move beyond the limited perception and simple algorithms of available robotic devices while still being practical and general enough for application on those same devices.

SUMMARY

According to one aspect of the present invention there is provided a robotic device comprising: a monocular multi-directional camera device to capture an image from a plurality of angular positions; at least one movement actuator to move the robotic device within a space; a navigation engine to control movement of the robotic device within the space; an occupancy map accessible by the navigation engine to determine navigable portions of the space, wherein the navigation engine is configured to: instruct a movement of the robotic device around a point in a plane of movement using the at least one movement actuator; obtain, using the monocular multi-directional camera device, a sequence of images at a plurality of different angular positions during the instructed movement of the robotic device; determine pose data from the sequence of images, the pose data indicating the location and orientation of the monocular multi-directional camera device at a plurality of positions during the instructed movement, the pose data being determined using a set of features detected within the sequence of images; estimate depth values by evaluating a volumetric function of the sequence of images and the pose data, each depth value representing a distance from the multi-directional camera device to an object in the space; and process the depth values to populate the occupancy map for the space.

In certain examples, the robotic device comprises an image processor to unwrap images captured by the monocular multi-directional camera device and output panoramic images for use by the navigation engine. The monocular multi-directional camera device may comprise a video device to capture video data comprising a sequence of frames. The monocular multi-directional camera device may comprise an omni-directional camera. The omni-directional camera may comprise a panoramic-annular-lens.

In certain cases, the occupancy map comprises a multi-dimensional grid, wherein entries in the grid indicate one of: an area in the plane of movement comprises free space and the area is navigable by the robotic device, and an area in the plane of movement comprises an object and the area is not navigable by the robotic device.

In one case, the robotic device may comprise a camera calibrator to calibrate the monocular multi-directional camera device by processing at least one captured image of a calibration pattern. The camera calibrator may be configured to determine camera model parameters by evaluating a function of captured image values and retrieved calibration pattern image properties.

In one variation, the monocular multi-directional camera device comprises a depth sensor and an image sensor and is arranged to capture depth and image data.

In one implementation, the robotic device may comprise a cleaning element, wherein the navigation engine is configured to: process the object occupancy map to determine a cleaning pattern for unoccupied areas of the space, and instruct an activation of the cleaning element according to the cleaning pattern. In this implementation, the cleaning element may comprise a vacuum device.

According to a second aspect of the present invention there is provided a method for determining object occupancy for a space navigable by a robotic device comprising: obtaining image data from a monocular multi-directional camera device coupled to the robotic device, the monocular multi-directional camera device being arranged to capture image data from a plurality of angular positions, the image data comprising a sequence of images having disparity within a plane of movement of the robotic device; determining pose data corresponding to the image data, the pose data indicating the location and orientation of the monocular multi-directional camera device, the pose data being determined using a set of features detected within the image data; estimating depth values by evaluating a volumetric function of the image data and the pose data, each depth value representing a distance from the monocular multi-directional camera device to an object in the space; and processing the depth values to populate an object occupancy map for the space, the object occupancy map being useable by the robotic device to navigate the space.

In one example, determining pose data corresponding to the image data comprises: detecting one or more features in each of a plurality of images in the sequence of images; matching the detected features across the plurality of images to determine a set of landmarks within the image data; and jointly optimising a set of camera pose estimates and a set of landmark location estimates for the sequence of images, the pose data comprising the set of camera pose estimates following joint optimisation. Jointly optimising the set of camera and landmark location estimates may comprise performing bundle adjustment. In certain cases, jointly optimising the set of camera and landmark location estimates may comprise using odometry data from the robotic device to constrain an optimisation function.

In one example, estimating depth values by evaluating a volumetric function comprises: determining a reference image from the sequence of images; determining a set of comparison images that overlap with the reference image; determining a photometric error between image values for the reference image and projected image values from the set of comparison images, wherein each projected image value comprises a projection of a comparison image to a viewpoint of the reference image using pose data for the reference image and pose data for the comparison image; and selecting depth values that minimise the photometric error. The photometric error may be determined based on a normalised pixel photometric error.

In certain cases, the monocular multi-directional camera device comprises an omni-directional camera device and the reference image comprises a 360-degree panorama of the space. In these cases, processing the depth values may comprise: determining closest depth values for each pixel column of the reference image; and using said closest depth values to populate two-dimensional occupancy grid values.

In one example, estimating depth values comprises determining variance measures for estimated depth values, and processing the depth values comprises: filtering the estimated depth values based on the determined variance measures, wherein the object occupancy map is populated based on the filtered depth values. In this example, the variance measures may comprise standard deviations for pixel depth measurements associated with a reference image and filtering the estimated depth values may comprise using depth estimates that have a standard deviation value that is below a predefined threshold. As such, estimating depth values may comprise computing a semi-dense depth map of the space.

In certain examples, the method may be repeated for multiple spaced circular movements of the robotic device within the space. In these examples, processing the depth values to populate the object occupancy map comprises integrating depth values from multiple depth maps to populate the object occupancy map.

The method may comprise using the object occupancy map to determine a navigation path for the robotic device through unoccupied areas of the space. Additionally and/or alternatively, the robotic device may comprise a cleaning element and the method may comprise using the object occupancy map to determine a cleaning pattern for unoccupied areas of the space, wherein the cleaning pattern indicates where the cleaning element is to be applied within the space.

According to a third aspect of the present invention there is provided a non-transitory computer-readable storage medium comprising computer-executable instructions which, when executed by a processor, cause a computing device to map a space, wherein the instructions cause the computing device to: receive a sequence of frames from a monocular multi-directional camera, the multi-directional camera being arranged to capture image data for each of the frames from a plurality of angular positions, the sequence of frames being captured at different angular positions within a plane of movement for the space; determine location and orientation estimates for the camera for each frame by matching detected features across the sequence of frames; bundle adjust the location and orientation estimates for the camera and the detected features across the sequence of frames to generate an optimised set of location and orientation estimates for the camera; determine a reference frame from the sequence of frames; evaluate a photometric error function between pixel values for the reference frame and projected pixel values from a set of comparison images that overlap the reference frame, said projected pixel values being a function of an object distance from the camera and the optimised set of location and orientation estimates for the camera; determine object distances for different angular positions corresponding to different pixel columns of the reference frame based on the evaluated photometric error function; and generate a map of navigable areas within the plane of movement for the space based on the determined object distances.

The monocular multi-directional camera may comprise an omni-directional camera. In this case, each frame may comprise an unwrapped omni-directional image. The omni-directional camera may comprise a panoramic-annular-lens. The sequence of frames may be received from a mobile video camera that is moved circumferentially within the space. In certain variations, the monocular multi-directional camera may comprise an image sensor and a depth sensor, wherein the sequence of frames comprises image data and depth data, the depth data is used with the image data to determine object distances.

In other examples, a non-transitory computer-readable storage medium may comprise computer-executable instructions which, when executed by a processor, cause a computing device, such as an embedded computer in a robotic device or a remote processor in a distributed system, to perform any of the methods discussed above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Certain examples described herein allow a robotic device to quickly and accurately navigate free-space, e.g. such as within interior rooms or exterior spaces. Certain examples use a monocular multi-directional camera device to obtain a sequence of images at a plurality of different angular positions within a space. For floor-based robots that move in an approximate x-y plane of movement, these images may comprise a sequence of closely-spaced images with disparity in all horizontal directions. They may be obtained by performing a number of circular or circumferential movements. These may be small movements in relation to the size of the space. The camera device may comprise a single omni-directional camera. Certain examples described herein then provide specific processing operations for these images. This processing is applicable within embedded computing resources of a robotic device. In one example, pose data is determined from the sequence of images using a feature-based approach. Once this pose data has been calculated for the sequence of images, a volumetric function of the images and the pose data is evaluated to determine depth values, e.g. representing a distance of objects within the space from the camera device. This two-step approach combines benefits of both sparse and dense approaches to modelling an environment, while selecting appropriate computations so as to limit the relative disadvantages of both approaches. The depth values may then be processed to populate an occupancy map for the space. This occupancy map may comprise a two-dimensional grid that is useable by the robotic device to navigate its environment. As such certain examples described herein combine two and three-dimensional computations in a manner that allows for fast evaluation on limited computer resources and/or real-time operation.

Certain techniques described herein may be applied as an initialisation or configuration routine when a mobile robotic device enters a new room or exterior space. This then enables a robotic device to rapidly populate an occupancy map, e.g. in a matter of seconds, that accurately maps free-space and that may be used for subsequent functioning, e.g. navigation, cleaning or item delivery. In test environments, certain approaches described herein provided high-quality occupancy maps that uncovered over 80% of the free-space detected using comparative LADAR methods while avoiding the need for expensive and complex LADAR equipment. Indeed, certain examples described herein provide for occupancy mapping using a singular low-cost passive camera, e.g. a Red-Green-Blue (RGB) video camera. This can enable a robotic device to obtain a global understanding of the space around it in real-time. Certain examples described herein are also easily extended, for example, following a first movement and the generation of an initial occupancy map, further movements may be initiated to update and improve the initial map.

Example Robotic Devices

Figure 1A:
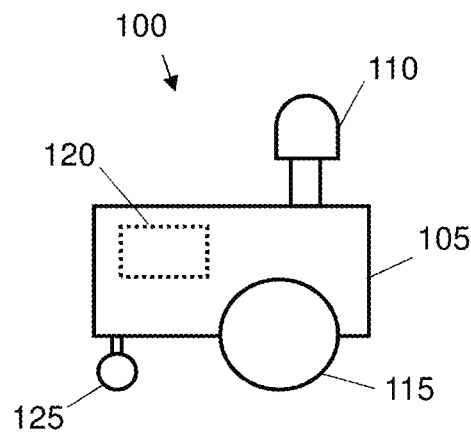
FIGS. 1A and 1B are schematic diagrams showing two examples of robotic devices.

FIG. 1A shows a first example 100 of a test robotic device 105 that may be used to generate an occupancy map as described herein. This test robotic device is provided for ease of understanding the following examples and should not be seen as limiting; other robotic devices of different configurations may equally apply the operations described in the following passages. The test robotic device 105 of FIG. 1A comprises a monocular multi-directional camera device 110 to capture an image from a plurality of angular positions. In use, multiple images may be captured, one after each other. In certain cases, the plurality of angular positions cover a wide field of view. In a particular case, the camera device 110 may comprise an omni-directional camera, e.g. a device arranged to capture a field of view of substantially 360 degrees. In this case, the omni-directional camera may comprise a device with a panoramic-annular-lens, e.g. the lens may be mounted in relation to a charge-coupled array. In the example of FIG. 1A, the camera device 110 is mounted on a configurable arm above the robotic device; in other cases, the camera device 110 may be statically mounted within a body portion of the test robotic device 105. In one case, the monocular multi-directional camera device may comprise a still image device configured to capture a sequence of images; in another case, the monocular multi-directional camera device may comprise a video device to capture video data comprising a sequence of images in the form of video frames. It certain cases, the video device may be configured to capture video data at a frame rate of around, or greater than, 25 or 30 frames per second.

The test robotic device 105 of FIG. 1A further comprises at least one movement actuator 115 that in this case comprises a set of driven wheels arranged in relation to the body portion of the test robotic device 105. The at least one movement actuator 115, which may comprise at least one electric motor coupled to one or more wheels, tracks and/or rollers, is arranged to move the robotic device within a space. An example of such a space is described later with reference to FIGS. 2A and 2B. The test robotic device 105 also comprises a navigation engine 120. This may comprise an embedded computing device as indicated by the dashed lines in FIG. 1A. For example, the navigation engine 120 may be implemented using at least one processor and memory and/or one or more system-on-chip controllers. In certain cases, the navigation engine 120 may be implemented by way of machine-readable instructions, e.g. firmware as retrieved from a read-only or programmable memory such as an erasable programmable read-only memory (EPROM). The navigation engine 120 controls movement of the test robotic device 105 within the space. For example, navigation engine 120 may instruct the at least one movement actuator to propel the test robotic device 105 forwards or backwards, or to differentially drive the wheels of the test robotic device 105 so as to turn or rotate the device. In FIG. 1A, the test robotic device 105 also has a rotatable free-wheel 125 that allows rotation of the test robotic device 105. In operation, the navigation engine 120 uses an occupancy map (not shown in FIG. 1A) to determine navigable portions of the space. For example, the navigation engine 120 may comprise a memory or other machine-readable medium where data implementing the occupancy map is stored. In one experimental configuration, a Pioneer 3DX mobile robot platform was used to implement the test robotic device 105.

Figure 1B:
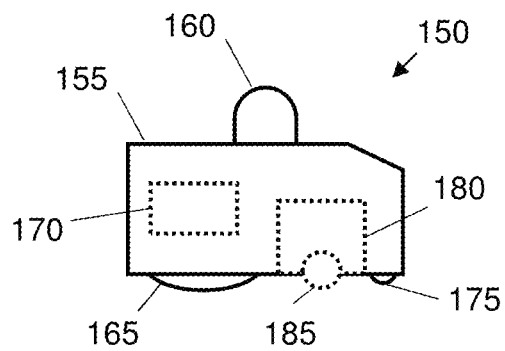

FIG. 1B shows another example 150 of a robotic device 155. The robotic device 155 of FIG. 1B comprises a domestic cleaning robot. Like the test robotic device 105, the cleaning robotic device 155 comprises a monocular multi-directional camera device 160. In the example of FIG. 1B, the camera device 160 is mounted on the top of the cleaning robotic device 155. In one implementation, the cleaning robotic device 155 may have a height of around 10 to 15 cm; however, other sizes are possible. The cleaning robotic device 155 also comprises at least one movement actuator 165; in the present case this comprises at least one electric motor arranged to drive two sets of tracks mounted on either side of the device to propel the device forwards and backwards. These tracks may further be differentially driven to steer the cleaning robotic device 155. In other examples, different drive and/or steering components and technologies may be provided. As in FIG. 1A, the cleaning robotic device 155 comprises a navigation engine 170 and a rotatable free-wheel 175.

In addition to the components of the test robotic device 105 shown in FIG. 1A, the cleaning robotic device comprises a cleaning element 180. This cleaning element 180 may comprise an element to clean a floor of a room. It may comprise rollers or brushes 185 and/or wet or dry elements. In one case, the cleaning element 180 may comprise a vacuum device, e.g. arranged to capture dirt and dust particles. In this case, the navigation engine may be configured to use an object occupancy map to determine a cleaning pattern for unoccupied areas of the space and instruct activation of the cleaning element 180 according to the cleaning pattern. For example, a vacuum device may be activated to clean an area of free-space within a room, as indicated by the object occupancy map, wherein the cleaning robotic device navigates obstacles within the room using the object occupancy map.

Example Motion for Robotic Device

Figure 2A:
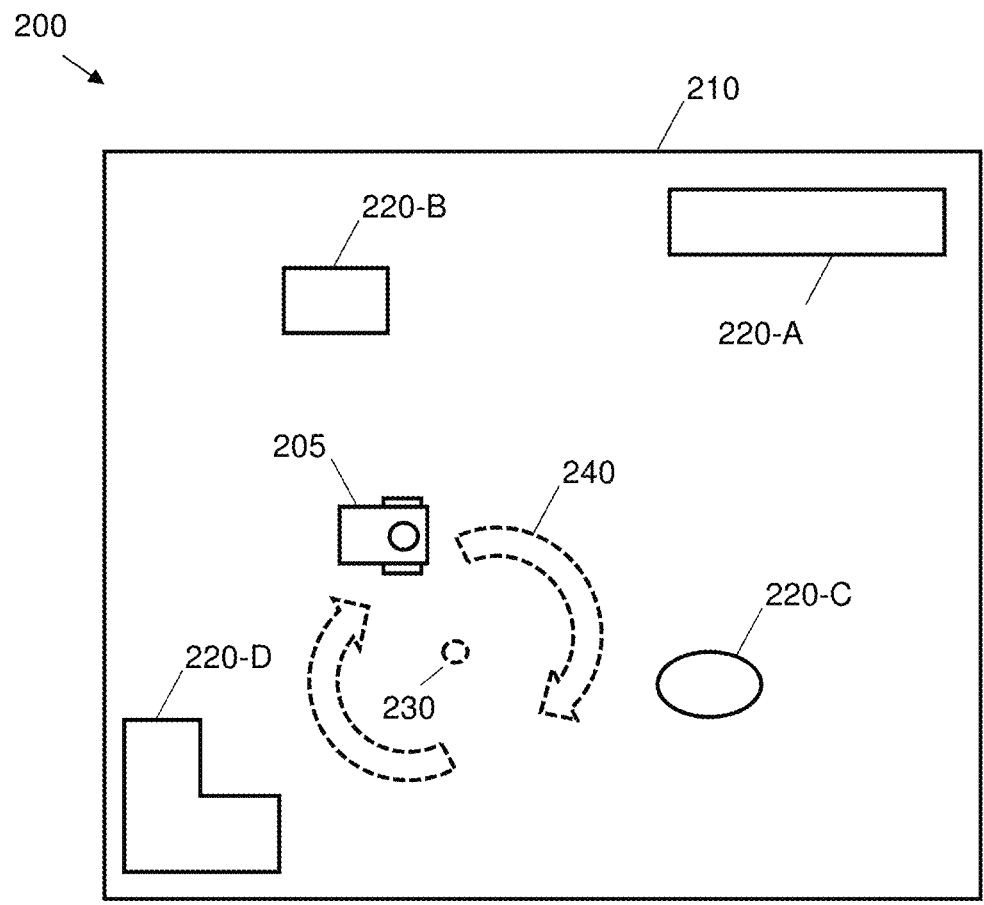
FIGS. 2A and 2B are schematic diagrams showing motion of a robotic device according to examples.
Figure 2B:
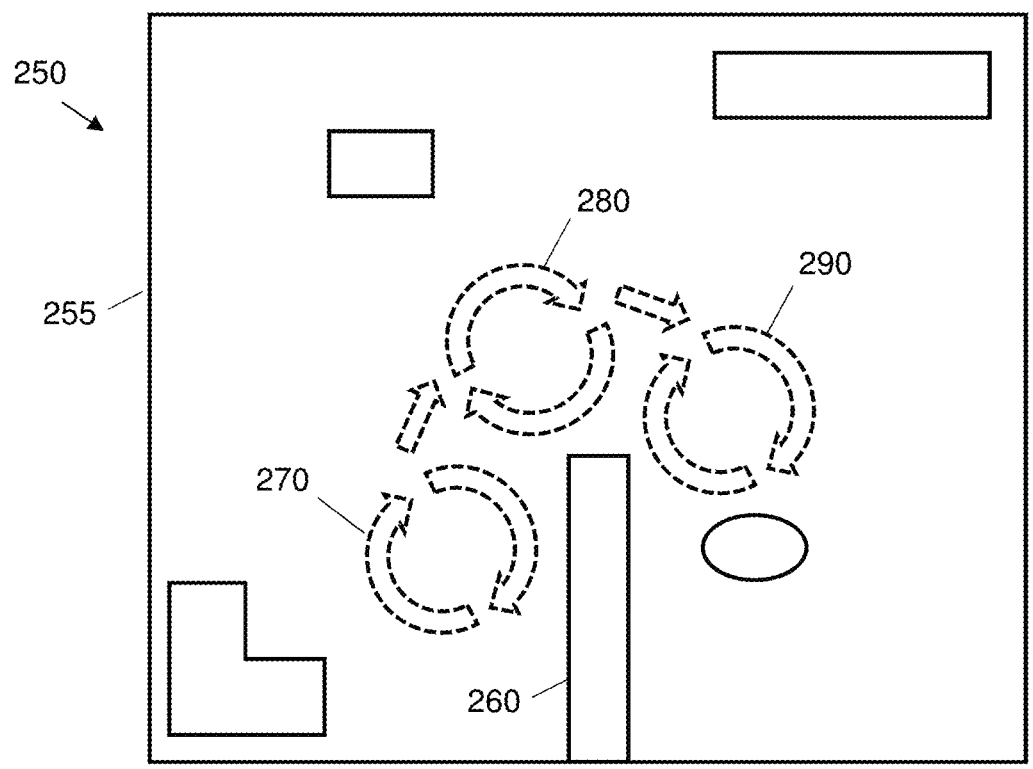

FIGS. 2A and 2B schematically show motion 200, 250 of a robotic device 205 within a space 210 according to two examples. The robotic device 205 may, in some examples, comprise a device as shown in FIGS. 1A and 1B. In FIGS. 2A and 2B the space 210 comprises a three-dimensional space in the form of an interior room. In other examples, the space may be any internal and/or external physical space, e.g. at least a portion of a room or geographical location. The space 210 in these examples comprises a number of physical objects 220 that are located with the space. These objects 220 may comprise one or more of, amongst others: furniture, building portions, equipment, raised floor portions, interior wall portions, people, electronic devices, animals, etc. Although the space 210 in FIGS. 2A and 2B is shown from above as being planar with a lower surface this need not be the case in all implementations, for example an environment may be aerial or within extra-terrestrial space. The lower surface of the space also need not be a level floor, e.g. it may comprise an inclined plane and/or multi-level series of planes.

In the example of FIG. 2A, the robotic device 205 is adapted to move around a point 240 in the space. For example, a navigation engine 120 or 170 as shown in FIG. 1A or 1B may be configured to instruct a movement 240 using at least one movement actuator, e.g. 115 or 165. During the movement 240, the robotic device 205 is configured to obtain a sequence of images at a plurality of different angular positions using an equipped monocular multi-directional camera device, e.g. 110 or 160 in FIG. 1A or 1B. For example, the movement 240 may comprise a substantially circular motion within a portion of the space. In certain cases, the movement 240 may comprise a complete loop, e.g. a rotation of 360 degrees around the point 230; in other cases, the movement may comprise a portion of a loop, e.g. a rotation of less than 360 degrees around the point 230. The movement 240 need not be circular, it may be a circumferential movement around at least a portion of a perimeter of any shape, e.g. any polygon including those with equal and unequal sides. In a relatively small-size room of around 4 or 5 metres square (e.g. an average domestic room), the movement 240 may comprise on the order of 0.5 metres across, e.g. may comprise a roughly circular motion with a diameter of 0.5 metres. This may take between 10-20 seconds. In certain test examples, for a small-size room, a sequence of images may comprise on the order of 100 or 200 frames.

In general, in the example of 2A, the robotic device 205 is controlled so as to perform at least one motion to enable the monocular multi-directional camera device to capture at least one sequence of closely-spaced images (e.g. video frames) that have disparity in a plurality of directions. For example, in a space with an approximately horizontal floor, i.e. forming a plane of movement for the robotic device 205, the sequence of closely-spaced images may have disparity in a plurality of horizontal directions. Comparatively, in spaces with an angled plane for movement, or in aerial or extra-terrestrial spaces, the disparity may be in a plurality of directions that are parallel with the plane of movement. This movement 240 may be seen as a brief explanatory movement, e.g. analogous to a (sub-conscious) human or animal ability to glance around a room to orientate themselves within the room. The movement 240 allows a robotic device 205 to quickly obtain a global idea of the shape and/or key features of the space. This is described in more detail in the sections below. This then provides a robotic device 205 with an ability to rapidly understand the global free space within a room, and facilitates intelligent high-level planning and semantic understanding of spaces.

FIG. 2B shows an example motion 250 that may be used in larger spaces, e.g. exterior spaces and/or multi-segment interior spaces. For example, the space 255 in FIG. 2B may comprise a room with at least one wall of 10-20 metres. In certain examples, as shown in FIG. 2B, the space may comprise a plurality of space portions that are separated by visual barriers, e.g. partition 260 may comprise, amongst others, a partial or full wall, a desk unit or an item of furniture. In FIG. 2B, the motion 250 comprises a plurality of movements 270, 280 and 290, e.g. a plurality of movements as described with respect to FIG. 2A. In FIG. 2B, three movements are shown; however, this is not intended to be limiting. In this case, the movements may comprise a set of similar or dissimilar movements, e.g. selected from a set of circular or circumferential movements around a point or at least a portion of a perimeter of a shape. For larger rooms, the movements may be larger than those described for smaller rooms, e.g. a circular movement may be around 1 metre in diameter. The plurality of movements may be controlled such that visual occlusions, such as partition 260, are at least partially circumnavigated. For example, data obtained from the first movement 270 may be used to detect partition 260 and instruct, e.g. by way of a navigation engine, a second movement 280 that takes place beyond the partition. The number of movements and/or the spacing between different movements may depend on the size of the space and/or the location of objects within the space. In a room with at least one wall of 10-20 metres the spacing may be of the order of 1-3 metres. In certain cases, additional movements may be performed until a predefined portion of space has been mapped. In the example of FIG. 2B, the robotic device 205 is configured to makes several small circular scans in sequence, moving to a new viewpoint in-between, whereby additional parts of the space are revealed since occluding obstacles are being rounded. The free space information obtained from all of these scans may then be merged into one global occupancy map, as is described in more detail in the following sections.

Example Occupancy Map

Figure 3:
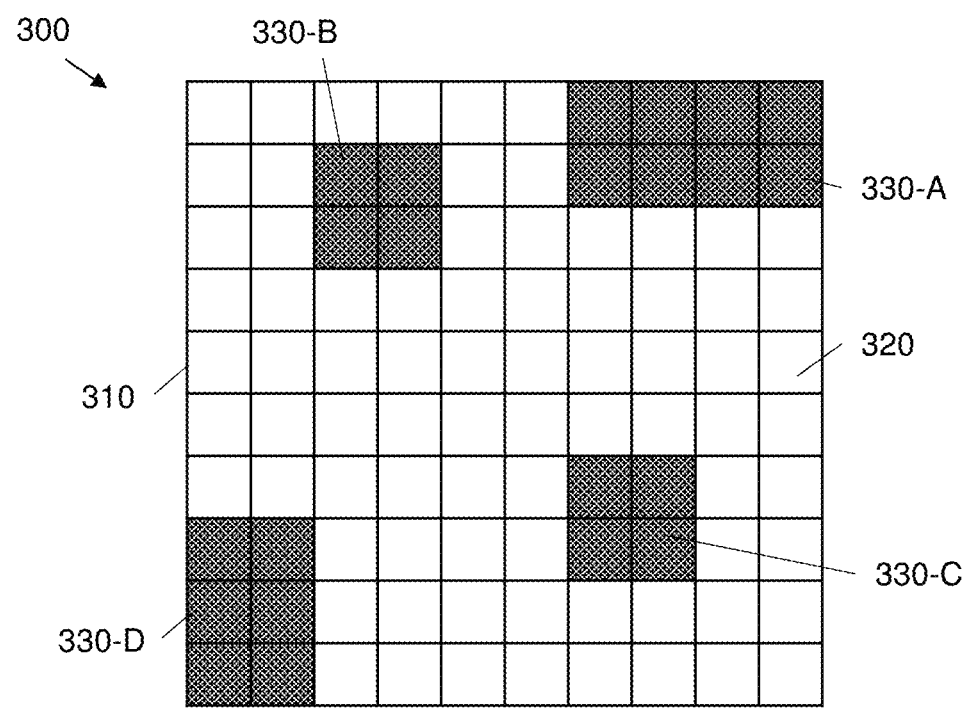
FIG. 3 is a schematic diagram showing a graphical representation of an occupancy map according to an example.

FIG. 3 shows an example occupancy map 300. This occupancy map 300 may be stored by one or more of the robotic devices 105, 155 and/or may be generated based on the motions similar to motions 200, 250 shown in FIGS. 2A and 2B. The occupancy map 300 may be accessible by a navigation engine of a robotic device to determine navigable portions of the space.

The example occupancy map 300 of FIG. 3 comprises a multi-dimensional grid 310. In the Figure, the occupancy map 300 comprises a regular two-dimensional grid of 10 by 10 cells 320. In other examples, the occupancy map 300 may be three-dimensional and/or comprise alternative cell sizes, shapes or resolutions. In certain test examples, occupancy map cells were associated with square areas of space with sides of 100 mm. The occupancy map 300 of FIG. 3 has grid or cell entries that indicate either that an area in the plane of movement comprises free space, and as such the area is navigable by the robotic device, or an area in the plane of movement comprises an object, and as such the area is not navigable by the robotic device. In the present example, the occupancy map 300 of FIG. 3 indicates the occupancy of the objects 220-A to D shown in FIG. 2A. Hence, a first set of shaded cells 330-A indicate that the corresponding area portions of the space are occupied by object 220-A; second set of shaded cells 330-B indicate that the corresponding area portions of the space are occupied by object 220-B; a third set of shaded cells 330-C indicate that the corresponding area portions of the space are occupied by object 220-C; and a fourth set of shaded cells 330-D indicate that the corresponding area portions of the space are occupied by object 220-D. Cells that are not shaded (e.g. the cell indicated by numeral 320) indicate free-space, e.g. within room 210. A robotic device, e.g. 105, 155 or 205, may thus use the occupancy map 300 to avoid objects 220 in FIG. 2A and navigate the free-space.

Occupancy maps, such as two-dimensional grids as shown in FIG. 3, provide a simple yet effective method to enable a robotic device to map a space. The occupancy maps may be stored as a matrix and/or array data structure in memory. In certain cases, entries may be binary, e.g. indicating a presence or absence of an object; in other cases, entries may comprise a value that indicates a probability of occupancy (e.g. in the form of a certainty of belief). In certain cases, an occupancy map may relate to x and y dimensions in a three-dimensional space. As such the occupancy may represent a z-plane within the space. This z-plane may be aligned with a plane of movement, e.g. a floor plane. In certain cases, if at least one portion of a z dimension corresponding to a grid cell, e.g. an area of x-y space, is occupied by an object, the grid cell may be set as "occupied".

Processing Pipeline Examples

Following examples of motion as shown in FIGS. 2A and 2B, and following an example occupancy map as shown in FIG. 3, certain examples of a processing operation will now be described. This processing operation is configured to take a sequence of images captured during the motion and generate an occupancy map.

Figure 4A:
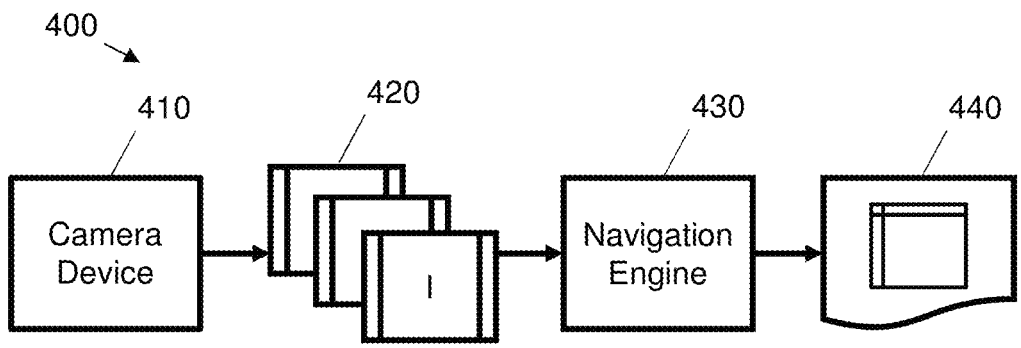
FIGS. 4A and 4B are schematic diagrams showing certain system components for use in generating an occupancy map according to two examples.

FIG. 4A schematically shows certain system components of a processing pipeline 400 for generating an occupancy map according to an example. In FIG. 4A, a camera device 410, which may comprise a monocular multi-directional camera device, captures a series or sequence of images 420 (each image is labelled with an "I"). These images 420 are captured at a plurality of different angular positions during at least one instructed movement of the robotic device, e.g. the images 420 may comprise video frames taken from a portion of video data that is recorded as a robotic device moves in the circular or circumferential motions shown in FIGS. 2A and 2B. In a video case, the images need not be consecutive video frames; instead they may comprise a subset of video frames that are selected according to at least one image processing criteria, e.g. such as meeting minimum contrast and/or focus metrics.

In FIG. 4A, the images 420 are accessed by a navigation engine 430. The navigation engine 430 is configured to process the images 420 to generate an occupancy map 440. In one example, the navigation engine 430 is configured to determine pose data from the sequence of images 420. In this case, the pose data indicates the location and orientation of the camera device 410 at a plurality of positions during the at least one instructed movement. In one case, the pose data is determined using a set of features detected within the sequence of images. The navigation engine 430 is further configured to estimate depth values by evaluating a volumetric function of the sequence of images 420 and the pose data. Each depth value represents a distance from the camera device 410 to an object in the space. The navigation engine 430 is then configured to process the depth values to populate the occupancy map 440 for the space.

In certain examples, the camera device 410 may comprise an RGB camera device arranged to capture RGB images (or video frames). In one case, the camera device 410 comprises a charge-coupled device (CCD) or complementary metal-oxide-semiconductor (CMOS) sensor. In one experimental configuration, a Point Grey® Flea3 camera was used featuring a Sony® CMOS sensor. In this experimental configuration, the camera device was fitted with a Sony® RPUC2512 low-profile omnidirectional lens to provide multi-directional imaging.

In other cases, camera device 410 may comprise other available digital devices and/or an analogue device wherein images 420 are generated by converting analogue signal sources. Each image 420 may comprise a two-dimensional representation of measured data. For example, an image 420 may comprise a two-dimensional array or matrix of recorded pixel values. In the example of FIG. 4A, all images 420 are the same size, although this need not be the case in all examples. Pixel values may comprise Red, Green, Blue pixel values for a given resolution (e.g. 1280×1024). In other examples, other colour spaces may be used and/or images 420 may comprise mono or grayscale pixel values. In one case, image data may comprise a compressed video stream or file. In this case, frames of image data may be reconstructed from the stream or file, e.g. as the output of a video decoder. Image data may be retrieved from memory locations following pre-processing of video streams or files.

In one case, the camera device 410 may be arranged to store the images 420 in a coupled data storage device, e.g. a solid state memory device forming part of the robotic device. In another case, the camera device 410 may transmit image data 420 to a coupled computing device. The coupled computing device may be directly coupled, e.g. via a universal serial bus (USB) connection, or indirectly coupled, e.g. the images 420 may be transmitted over one or more computer networks. In yet another case, the camera device 410 may be configured to transmit the images 420 across one or more computer networks for storage in a network attached storage device. This transmission may be a wireless transmission, e.g. other a wireless network or Bluetooth® connection. Images 420 may be stored and/or transmitted on a frame-by-frame basis or in a batch basis, e.g. a plurality of frames may be bundled together.

In certain cases, the navigation engine 430 may form part of a robotic device, e.g. as shown in FIGS. 1A and 1B. In other cases, at least a portion of the navigation engine 430 may be distributed, e.g. located on one or more coupled computing devices. For example, these computing devices may comprise part of a powered charging stations and/or a network-coupled computing resource.

Figure 4B:
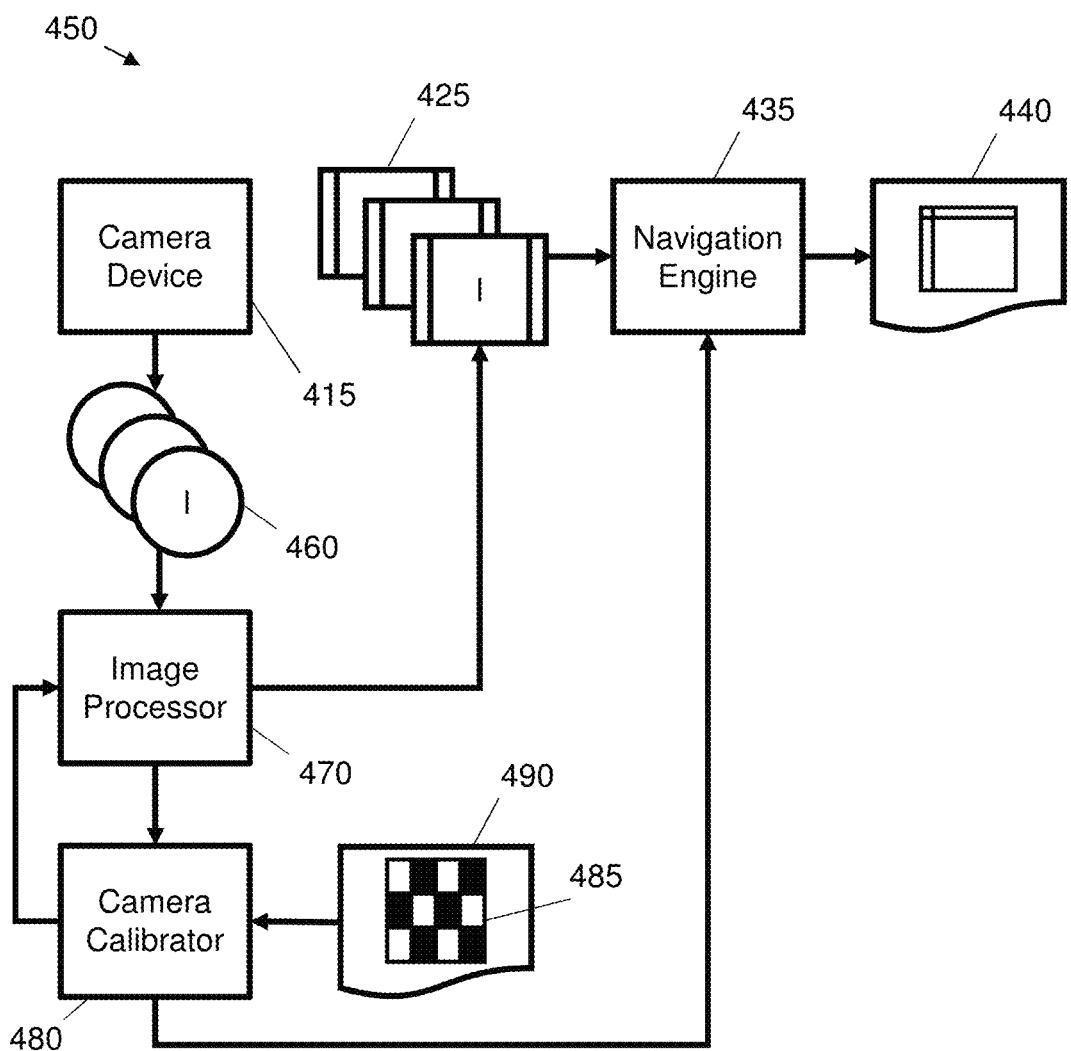

FIG. 4B shows a second example of a processing pipeline 450 that may be used to generate occupancy map 440 in certain implementations. In the example of FIG. 4B, the camera device 415 comprises an omni-directional camera device, e.g. as may be implemented using the experimental configuration set out above. In this case, the camera device 415 generates raw omnidirectional images 460. For example, these may comprise circular images associated with an observed hemisphere of space. The processing pipeline 450 comprises an image processor 470 that is configured to receive the raw omnidirectional images 460. The image processor 470 unwraps the raw omnidirectional images 460 captured by the camera device 415 and outputs panoramic images 425 for use by the navigation engine 435. The image processor 470 may use camera model parameters to perform the unwrapping. Unwrapping the raw omnidirectional images 460 facilitates subsequent pose and depth estimation operations. In one example, the image processor 470 may be configured to use a look-up table to implement the unwrapping and to create a spherically mapped panoramic image from each raw omnidirectional image for use in subsequent processing. In certain cases, sub-pixel interpolation may be used. Unwrapping raw omnidirectional images has a benefit that image dimensions fit well within memory of commercially available graphical processing units and that each pixel represents a uniform area on a surface of a sphere.

The processing pipeline 450 of FIG. 4B also comprises a camera calibrator 480. Although both an image processor and a camera calibrator are shown in FIG. 4B, in other examples, an image processor and a camera calibrator may be used separately. The camera calibrator 480 is configured to calibrate the camera device 415 by processing at least one captured image of a calibration pattern 485. The calibration pattern 485 may be present within the space, e.g. as a printed pattern or a liquid crystal display output visible within the space. In one case, the calibration pattern 485 may be present on a charging and/or docking station of a robotic device. The calibration pattern 485 may comprise a chequerboard pattern, e.g. of black and white squares. The camera calibrator 480 is configured to determine camera model parameters, i.e. parameters modelling the characteristics of camera device 415, by evaluating a function of captured image values and retrieved calibration pattern image properties. Retrieved calibration pattern image properties are determined from a retrieved representation 490 of the calibration pattern. In one case, the camera calibrator 480 may be configured to instruct the capture of a series (e.g. ten) images while the camera device 415 is moved around to cover an entire field of view. In this case, on each image a rough location of the pattern is provided (e.g. by a user or based on a known position such as a given distance from a docking station). Each image is then unwrapped to a rectangular patch and corners of the calibration pattern are detected. The coordinates of the corners are then recalculated to an original image space. The procedure is repeated for all of the series of images. From this, with a set of point pairs and initial parameter values, Levenberg-Marquardt non-linear optimisation may be applied to minimise a function of the camera model parameters. In examples, camera model parameters may comprise at least one of: a mirror shape parameter, radial and tangential distortion coefficients and pinhole camera intrinsic parameters. Extrinsic parameters such as a rotation matrix and a translation vector may also form part of the camera model parameters; these may be estimated using motion as part of the pose estimation performed by the navigation engine 435. In certain cases, these extrinsic parameters may represent six degrees of freedom. The camera model may comprise an adapted Geyer and/or Barreto catadioptric camera model, e.g. as described in C. Geyer, "Catadioptric Projective Geometry: theory and applications", PhD thesis, University of Pennsylvania, 2003 and J. P. d. A. Barreto, "General central projection systems: Modeling, calibration and visual serving", PhD thesis, University of Coimbra, 2004. Such a camera model may be similar to a pinhole model with the addition of an extra parameter determining a curvature of a lens mirror.

Example of Navigation Engine Components

Figure 5:
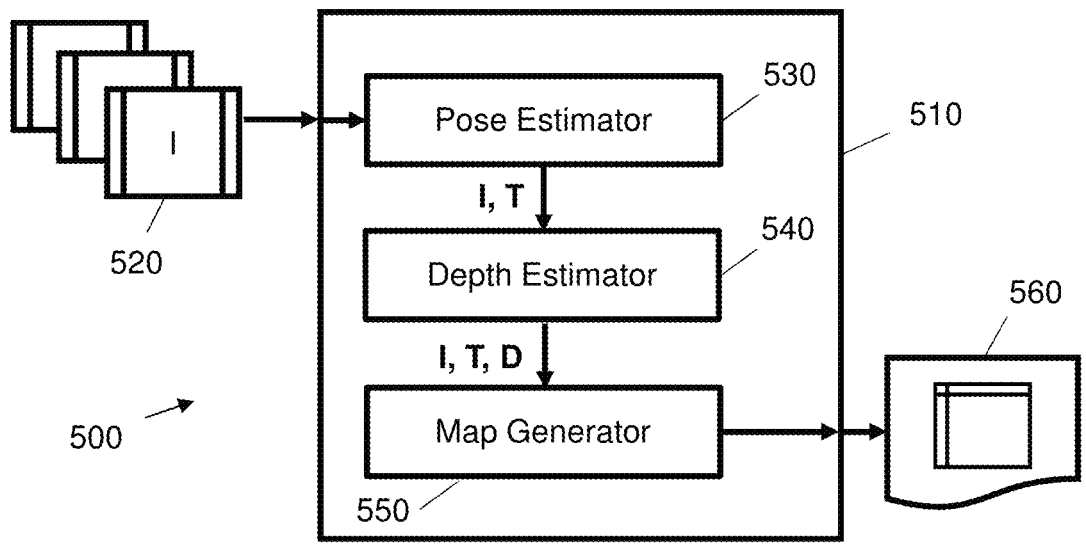
FIG. 5 is schematic diagram showing certain system components of a navigation engine according to an example.

FIG. 5 shows an example 500 of a navigation engine 510 that may be used to generate an occupancy map. The navigation engine 510 may be used to implement any of the navigation engines 120, 170, 430 and 435 described above. The navigation engine 510 receives a sequence of images 520, e.g. as captured during a movement of the robotic device as described above. The sequence of images 520 may comprise unwrapped omni-directional images 425 as described with reference to FIG. 4B. The navigation engine 510 comprises at least three system components: a pose estimator 530, a depth estimator 540 and a map generator 550.

The pose estimator 530 is configured to receive the sequence of images 530 and generate a set of pose estimates, T. A pose estimate may be generated for each received image 520 and may comprise values for a rotation matrix and a translation vector, e.g. the extrinsic camera model parameters. In certain cases, configuration operation, such as performed by camera calibrator 480 in FIG. 4B, may also determine a robotic device base/body to camera device transform, e.g. representing a mounting relationship between the camera device and the robotic device base. For certain static mountings this robotic device base/body to camera device transform may be regarded as an identity transform. The pose estimator 530 may be configured to extract features from the images 520, to match those features across the sequence of images 520 and to bundle adjust at least a set of initial pose estimates for the images 520 in order to generate the set of pose estimates, T.

The depth estimator 540 is configured to receive the sequence of images 520 and the set of pose estimates, T, from the pose estimator 530. In certain cases, pose estimation may not be possible for all images within the sequence 520. Using images that have available pose estimates, the depth estimator 540 in the present example is configured to evaluate a volume function to determine depth estimates, D. In one case, the depth estimator 540 is configured to evaluate a dense omni-directional cost volume around a reference image, the reference image being selected from the sequence of images 520. In this case, depth values may be calculated for a set of pixels of the reference image. Depth values may be selected that minimise brightness discrepancies with a set of comparison images from the sequence of images 520. In one example, certain pixels may be ignored when evaluating depth values. This may be thought of as a filtering or selection of depth values so as to only consider depth estimates that have an associated high accuracy or confidence for generation of the occupancy map. One example approach for performing this filtering is described later with reference to FIGS. 9A and 9B.

The map generator 550 is configured to receive the depth estimates, D, and to populate an occupancy map 560. In one case, as illustrated, the map generator 550 may also receive images I and pose estimates T, or have access to this data. In one case, depth values for pixels of a reference image may form a depth map. In a case with unwrapped images, e.g. as described with reference to FIG. 4B, each column of an estimated depth map (i.e. each column of depth values) represents a different viewing angle or angular position with reference to a camera device. If an omni-directional camera device is used, a depth map may be associated with an unwrapped spherical image, and as such, each column of the depth map represents a different viewing angle or angular position around a 360 degree field of view. In one case, the map generator 550 may be configured to select a closest valid depth measurement for each column of depth values. For columns where a closest depth estimate is successfully found then this is used as a boundary point for a free space region. From the reference image pose estimate to this point a line of sight marks underlying occupancy grid cells as free space by checking a line to cell intersection and increasing a free space counter of the intersected cell. For example, a line may be cast, the line being thought of as a ray or line of sight from the reference pose for the analysed depth map to an estimated depth point at a particular viewing angle. To mark cells in the occupancy map, a line-to-cell intersection test may be performed, wherein the cell may be represented as a square in the space. As such geometrical computations may be used to mark cells under the line as free and the end point of the line as the occupied space, e.g. a boundary point in a free-space map. By integrating a plurality of free space boundary points from a depth map, global free space may be mapped in an occupancy grid implementing the occupancy map 560.

In certain cases, the sequence of images 520 comprises batches of images from multiple movements (e.g. as in the example of FIG. 2B). In this case, the pose estimator 530 and depth estimator 540 may operate on each of these batches. In one implementation, the depth estimator 540 may be configured to estimate depth values in association with a reference image for each batch, wherein a batch corresponds to one of the movements 270, 280, 290. In this case, comparison images may also be selected from a corresponding batch of images. Multiple depth maps, each corresponding to a particular batch and movement, may then be generated by the depth estimator 540 and passed to the map generator 550. The map generator 550 may then be configured to integrate closest depth estimates from the plurality of depth maps, representing maps of different portions of a space, to populate a global occupancy map for the space.

The system components 510 may be seen to combine "sparse" and "dense" image processing in a manner that enables an occupancy map to be generated in real-time without onerous computing requirements. In this case, the pose estimator 530 may be seen to apply "sparse" processing, e.g. processing that utilises key-points or extracted features. These key-points and extracted features are of a limited number in comparison with full volumetric models that may comprise a large number of voxels to model the space. "Sparse" processing based on extracted, matched and bundle adjusted features has an advantage that it is quicker to process than comparative "dense" pose estimation techniques. The use of a reference image enables relatively "dense" depth maps to be determined, e.g. wherein depth values are determined on a pixel-by-pixel basis, while reducing the computational load. Additionally, use of filtered depth values or "semi-dense" depth maps further speed up processing. Filtered or "semi-dense" depth maps based on an accuracy or confidence of the depth values further addresses a problem of mapping spaces with textureless areas. In these cases, textureless areas, e.g. walls of an empty room, may have little information content for depth estimation. This may result in unreliable estimates that can lead to incorrect occupancy maps. However, such depth values are filtered in certain cases, and as such they are not used to generate an occupancy map.

In one case, the navigation engine 510 may acquire the sequence of images 520 via an image acquisition interface. This may be coupled to the camera devices 110, 160, 410, 415 of the previous examples. The image acquisition interface may comprise a hardware interface, such as a USB or network interface, and computer program code implementing software drivers. In one case, the navigation engine 510 may be configured to operate on streaming data, e.g. live video data. In another case, the navigation engine 510 may be communicatively coupled to the camera device and be arranged to store images 520 received from the camera device in one or more of persistent and non-persistent data storage, e.g. frames of data may be copied into memory and/or may be stored in a hard disk drive or solid state storage. In another case, images 520 may be stored externally to the navigation engine 510 in a given file format, e.g. in one or more files accessible in a data storage device. In this case, the navigation engine 510 may use or implement part of a file system to at least read data from the one or more files. The navigation engine 510 may comprise dedicated processing electronics and/or may be implemented by way of computer program code executed by a processor of at least one computing device. In cases such as those shown in FIGS. 1A and 1B, the navigation engine 510 may comprise one or more embedded computing devices. This may comprise at least one processor operating in association with memory to execute computer program code loaded onto a computer readable medium. This medium may comprise solid state storage such as an erasable-programmable-read-only memory and the computer program code may comprise firmware. In other cases, the navigation engine 510 may comprise a suitably configured system-on-chip, application-specific integrated circuit and/or one or more suitably programmed field-programmable gate arrays. In one case, the navigation engine 510 may be implemented by way of computer program code and/or dedicated processing electronics in a mobile computing device and/or a desktop computing device; in this case, the navigation engine 510 may be configured to receive images transmitted from a robotic device and/or to transmit the generated occupancy map back to the robotic device. Other implementations of distributed computing may also be used without deviating from the described examples herein. In one case, navigation engine 510 may be implemented, in whole or in part, as well as or instead of the previous cases, by one or more graphical processing units executing computer program code. In certain cases, the navigation engine 510 may be implemented by way of one or more functions implemented in parallel, e.g. on multiple processors and/or cores of a graphics processing unit.

Example Methods for Determining Object Occupancy

Figure 6:
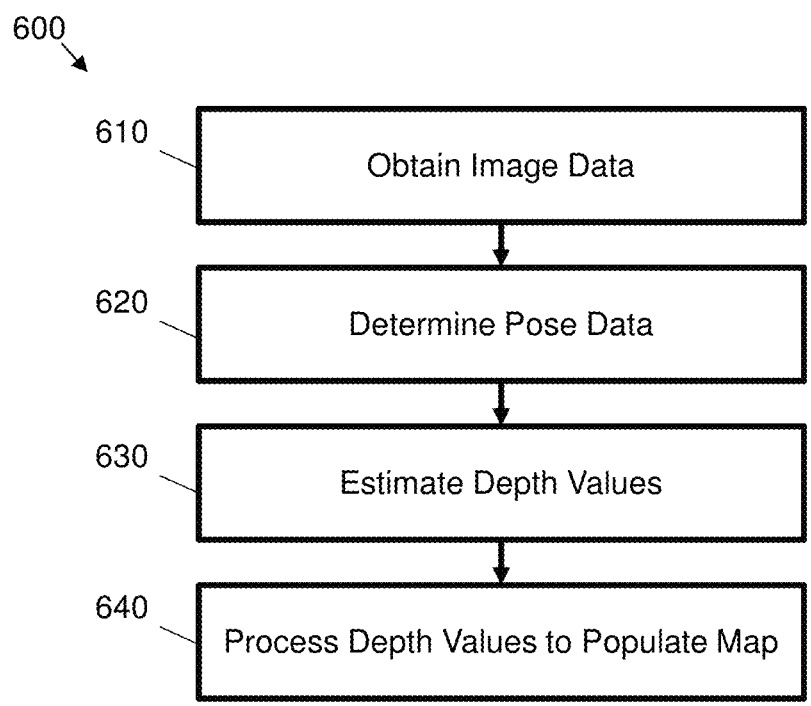
FIG. 6 is a flow diagram showing a method for determining object occupancy for a space navigable by a robotic device according to an example.

FIG. 6 shows a method 600 for determining object occupancy for a space navigable by a robotic device according to an example. This method may be applied by the aforementioned navigation engine examples or any other suitable computing device.

At block 610, image data is obtained from a monocular multi-directional camera device coupled to the robotic device. As in previous examples, the monocular multi-directional camera device is arranged to capture image data from a plurality of viewpoints or angular positions. The image data comprises a sequence of images, e.g. a set of video frames, having disparity within a plane of movement of the robotic device, e.g. horizontal disparity for floor-located devices.

At block 620, pose data corresponding to the image data is determined. The pose data indicates the location and orientation of the monocular multi-directional camera device, e.g. rotation and translation parameter values in up to six degrees of freedom. In certain cases, the degrees of freedom may be constrained, e.g. in certain implementations movement may be assumed to reside in a floor plane and as such there may be no translation along the z-axis and rotation may be restricted to being around the z-axis. In the present example, the pose data is determined using a set of features detected within the image data.

At block 630, a set of depth values are estimated by evaluating a volumetric function of the image data from block 610 and the pose data from block 620. Each depth value in this case represents a distance from the monocular multi-directional camera device to an object in the space.

Lastly at block 640, the depth values are processed to populate an object occupancy map for the space. The object occupancy map is useable by the robotic device to navigate the space. For example, in one case the object occupancy map may be used to determine a navigation path for the robotic device through unoccupied areas of the space, e.g. to avoid areas of an occupancy grid that are marked as occupied. In one case, the robotic device may comprise a cleaning element. In this case, the method may comprise using the object occupancy map to determine a cleaning pattern for unoccupied areas of the space, wherein the cleaning pattern indicates where the cleaning element is to be applied within the space. For example, a cleaning pattern may indicate that a cleaning element is to be applied to areas of free-space (e.g. that are not marked as occupied on an occupancy grid).

Figure 7:
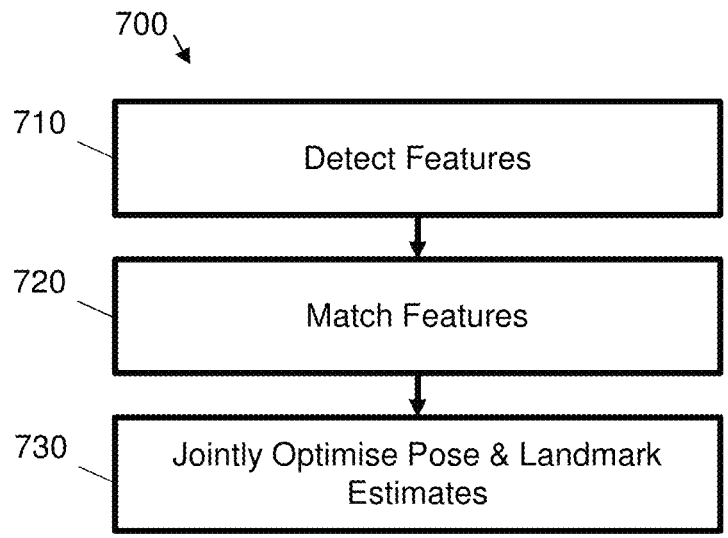
FIG. 7 is a flow diagram showing a method of estimating pose data for a camera device according to an example.

FIG. 7 shows a method 700 that may be used to implement block 620 in certain implementations.

At block 710, one or more features are detected in each of a plurality of images in the sequence of images obtained at block 610. In one case, features may be detected with a FAST (Features from Accelerated Segment Test) corner detector as described by E. Rosten and T. Drummond in "Machine learning for highspeed corner detection" in the Proceedings of the European Conference on Computer Vision (ECCV), 2006. This provides high-speed feature detection suitable for real-time video processing. Features may be detected in each image, e.g. each frame of video data, or selected subset of images (such as every $x_{th}$ frame of a video feed). Feature may be described using scale-invariant feature transform (SIFT) descriptors, e.g. as described by D. G. Lowe in "Distinctive image features from scale invariant keypoints" in the International Journal of Computer Vision (IJCV), 60(2):91-110, 2004. Other features detectors and/or descriptors may be used.

At block 720, the detected features from block 720 are matched across the plurality of images to determine a set of landmarks within the image data. Landmarks in this case comprise points of correspondence between images, e.g. a landmark may relate to static portions of an object within the space that is captured in several successive images as a robotic device moves around the space, e.g. a corner of a piece of furniture, a picture on a wall, or a part of a chair. This block may comprise a feature-based motion estimation operation that runs iteratively and, with each new image (e.g. a new frame of video data), matches newly detected features in the new image against a list or map of existing landmark features. If no match is found, e.g. if detected features comprise completely new features, then a new landmark entry in the list or map may be added. Features may be matched in an inner filtering loop against a current landmark list or map, based on a reprojection error in the image plane and a SIFT descriptor distance.

At block 730, a set of camera pose estimates and a set of landmark location estimates for the sequence of images are jointly optimised. The pose data output by block 620 in FIG. 6 then comprises the set of camera pose estimates following joint optimisation. Joint optimisation may comprise minimising an energy function with at least a visual part that imposes constraints between camera pose estimates, landmark locations and their respective matched features. The energy function may comprise a binary term that indicates whether a particular feature i is seen in an image j. The visual part of the energy function may evaluate a difference between a predicted feature value (e.g. a predicted pixel value associated with feature i for image j) and an actual feature value (e.g. an actual pixel value associated with feature i for image j). This difference may be evaluated over n features and m images. The predicted feature value may be computed based on a projection, using camera parameters, of a rotation matrix applied to a landmark position minus the rotation matrix applied to a translation vector. This may be applied using initial pose estimates for each image in the sequence of images, each initial pose estimate comprising initial values for the rotation matrix and translation vector with respect to the image. The visual part may use the Huber norm to normalise the differences.

In implementation, odometry data from the robotic device may be used to constrain an optimisation function. Odometry is the use of data from motion sensors to estimate a change in position over time. Odometry data may arise from the at least one movement actuator of the robotic device, e.g. tracking the position of wheels 115 or tracks 165 in FIGS. 1A and 1B. The optimisation function may comprise the energy function described above. In that case, the energy function may have an additional odometry part (e.g. an odometry term). The odometry part may evaluate a difference between a change in translation vectors between consecutive images and a change in odometry vectors associated with times the consecutive images were captured. This is equivalent to considering a difference between movement as indicated by the translation vectors and movement as indicated by odometry data, the movement occurring between the capture of the two consecutive images (e.g. a distance between images or frames of video data). This method may be applied even if odometry is not captured with image capture, which reduces a need for advanced control processing. Additionally or alternatively, odometry data, if available, may be used to initialise one or more pose estimates, e.g. within the joint optimisation. Standard deviations from a precision matrix may be used to weight both terms in the energy function. The differences in the odometry part may be weighed and made robust using the Cauchy loss function. The energy function as described may be optimised using an iterative Levenberg-Marquardt function with the Jacobians calculated by means of auto-differentiation.

In one implementation the joint optimisation may comprise a bundle adjustment. The bundle adjustment may be an adaptation of the methods described by Bill Triggs et al. in "Bundle adjustment—a modern synthesis", Vision algorithms: theory and practice, Springer Berlin Heidelberg, 2000, 298-372. This may use non-linear optimisation.

In certain cases, features may be first matched by way of putative matches. Preliminary bundle adjustment may then be applied to these putative matches. A putative match may then be rejected if its reprojection error is too large. This selection and rejection may be repeated multiple times before a final bundle adjustment is performed. In one case, to generate new landmarks, the image is divided into a number of patches (e.g. 16). Features in the form of keypoints may then be selected in such a way that in each patch at least a predefined number of features are retained (e.g. 5), that are each at least a given number of pixels away from all others (e.g. 10 pixels). This particular operation can contribute to a uniform distribution of high quality features to track. New landmarks may be initialized as a given distance away (e.g. 7.5 m depending on the environment) and when later matched they are bundle adjusted to the correct depth.

Figure 8:
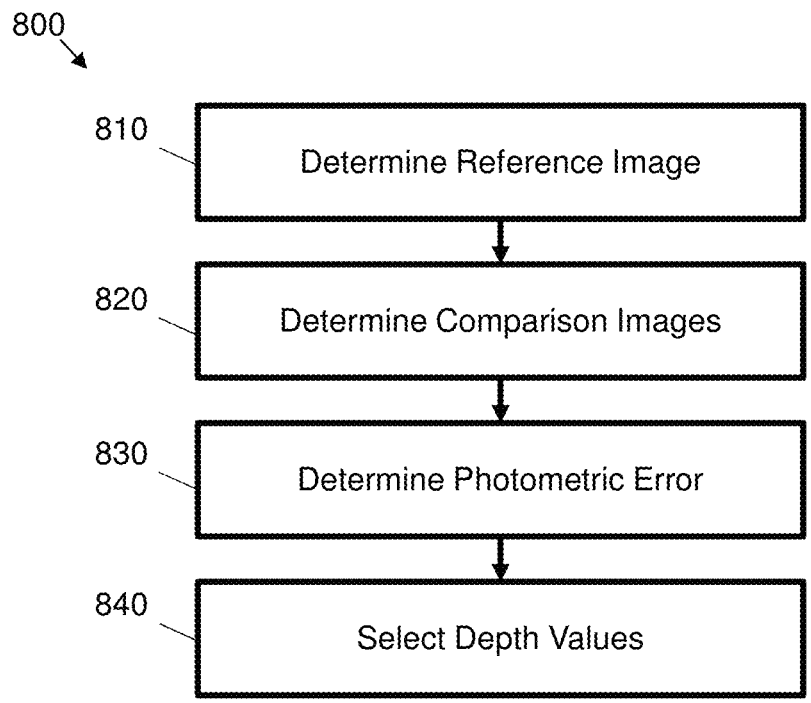
FIG. 8 is a flow diagram showing a method of estimating depth values according to an example.

FIG. 8 shows another method 800 that may be used to implement block 630 in certain implementations. The method 800 may be implemented as well as, or independently, of the method 700.

At block 810, a reference image is determined from the sequence of images obtained at block 610. In one case, if images are captured along a circle or arc movement path, then a reference image may be selected from near the middle of the circle or arc such that additional images are present that correspond to either side of the reference image (e.g. that are captured before and after the determined reference image). In other cases, for example those using an omnidirectional and/or full circular motions, the reference image may be selected at random from the captured images or selected based on one or more image quality metrics. At block 820, a set of comparison images that overlap with the reference image are determined. Overlap may be defined as at least one pixel in a comparison image which contains image data from a portion of the space that is also imaged, e.g. from a different orientation and/or location, in a pixel of the reference image (although the location of the pixel may vary between the reference image and a comparison image). At block 830, a photometric error is determined between image values for the reference image and projected image values from the set of comparison images. The photometric error may be based on a normalised pixel photometric error.

Each projected image value comprises a projection of a comparison image to a viewpoint of the reference image using pose data for the reference image and pose data for the comparison image, e.g. a reprojection of the comparison image data to the point of view of the reference image. At block 840, depth values are selected that minimise the photometric error. For example, the projection of the comparison image may comprise a scalar depth term, d. The photometric error may involve subtracting a (re)projected pixel value using the depth term, camera parameters and pose estimate from a pixel value taken from the reference image. This may be normalised using the Huber norm and evaluated per comparison image, with the total error being the sum of the error for the set of comparison images. The photometric error may be weighted by a number of successful (re)projections. To select a depth value, a set of photometric errors for different depth values, d, may be searched until a minimum photometric error is located, wherein the depth value associated with the minimum photometric error is selected for the pixel.

The method 800 may be seen to use a "cost volume" wherein each voxel accumulates squared photometric error between images. The method 800 may be seen as an adaptation of the methods described by R. A. Newcombe, S. Lovegrove, and A. J. Davison in "DTAM: Dense Tracking and Mapping in Real-Time", in the Proceedings of the International Conference on Computer Vision (ICCV), 2011.

In certain cases, when applying a method such as 800 in FIG. 8, regularisation cost terms may be applied to obtain a smooth and fully dense depth map. This regularisation may be performed using a Huber Rudin-Osher-Fatemi (ROF) Total Variation (TV) L1 regulariser. However, this may lead to problems where certain image regions are badly conditioned for depth estimation. For example, this may be the case where image regions lack texture. These image regions may lead to unreliable depth value estimates, even when regularisation is applied. Based on this, in certain implementations, one or more variance measures are determined for estimated depth values; these variance measures are then used to filter the estimated depth values, wherein the object occupancy map is populated based on the filtered depth values. This then acts to extract only useful or accurate depth information, e.g. in the form of a "semi-dense" representation where only a subset of depth values are used. This may alleviate the need to perform regularisation, thus simplifying the method and reducing computation requirements. Also using a regulariser such as the Huber ROF TV L1 regulariser may lead to poor performance in spaces with a significant number of textureless areas, e.g. representing blank walls in an (empty) room, and/or lead to oversmoothing. By using a "semi-dense" approach as described herein, only accurate (e.g. "trusted") measurements with a high confidence or reliability are used. This leads to good performance even in spaces with large areas that lack substantial texture (e.g. as represented by pixel variation), such as empty rooms or rooms with blank walls or partitions. In tests it was found that many environments resulted in a substantial proportion of the three-dimensional depth map having unreliable measurements. By using the methods of the present examples these unreliable measurements are not used to populate the occupancy map.

In the example of FIG. 8, filtering or selecting estimated depth values may comprise selecting only a subset of pixel depth values that are computed for the reference image. In certain cases, the variance measures comprise standard deviations for pixel depth measurement associated with a reference image. In these cases, filtering the estimated depth values comprises using depth estimates that have a standard deviation value that is below a predefined threshold.

Figure 9A:
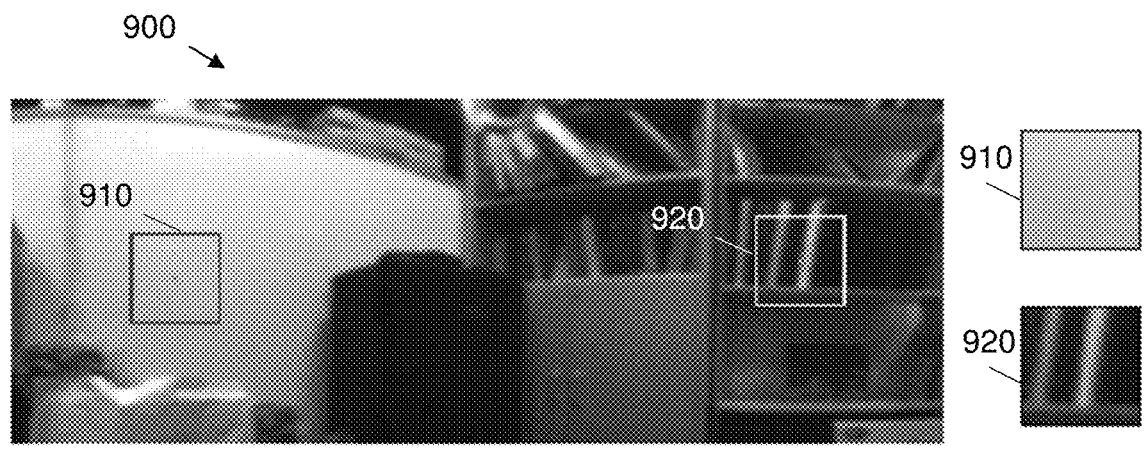
FIG. 9A is an example image from a robotic device showing two areas with different image characteristics.

FIG. 9A shows an example image portion 900. The image portion 900 may form part of an unwrapped panoramic image (e.g. a reference image) as described herein. The image portion 900 has two highlighted areas: a first area 910 and a second area 920. The first area 910 is relatively smooth and textureless (e.g. low texture); it captures an image of a back of a wall of a desk unit. As such the first area 910 may not generate an accurate depth measurement. The second area 920 has detail (e.g. high texture) that may be used to generate an accurate depth measurement. In FIG. 9A the second area 920 captures an image of part of a bookshelf. These two areas 910, 920 have different energy responses in their respective cost volume depth sampling.

Figure 9B:
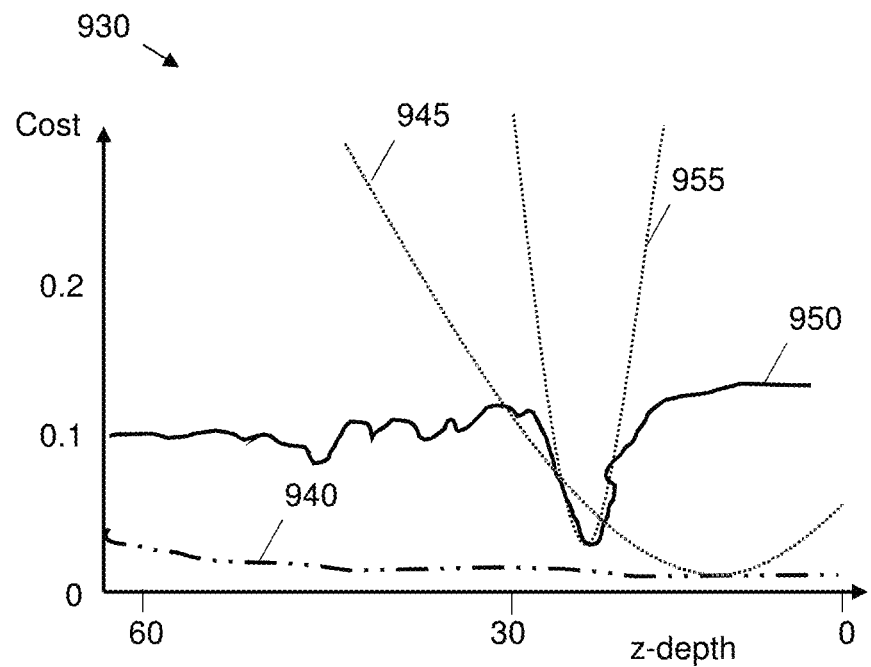
FIG. 9B is a chart showing depth values for the two areas of FIG. 9A according to an example.

In one case, the standard deviation of a depth estimate may be estimated by fitting a graph to the cost function. FIG. 9B shows an output 930 of a cost-function for the two areas 910, 920 of FIG. 9A. A cost function value is plotted on the y axis against depth values (e.g. d or z-values) on the x axis. A first output 940 is shown for the first area 910. As may be seen the first output 940 has relatively small cost function values, ranging from about 0.025 to 0.005 in an approximately linear manner. A second output 950 is then shown for the second area 920. As may be seen the second output 950 differs from the first output 940: there is variation around a cost value of 0.1 with a dip in the cost function at around a z-value of around 20.

In the above described methods a depth value may be estimated by selecting a minimum value of the cost function. As may be seen in FIG. 9B this is difficult for the relatively flat first output 940. However, there is a clear minimum around a depth value of 20 for the second output 950. By fitting a parabolic function to each of the first and second outputs 940 and 950, it is possible to determine a minimum value that may be used for the depth estimate as well as a standard deviation that may be used to filter the depth estimate. Fitting a parabolic function moreover allows for subpixel depth resolution (e.g. as the minimum of the parabola may be selected as a continuous value). FIG. 9B shows a first parabola 945 fitted to the first output 940 and a second parabola 955 fitted to the second output. By fitting a quadratic function to the output of the cost function the shape of a parabola, in the form of the 'a' parameter of the function (e.g. $y = ax^2 + bx + c$), may be determined. From this the standard deviation for a pixel in the inverse depth domain may be calculated as the inverse of the square root of the 'a' parameter. This may then be converted into a standard deviation in the depth domain by dividing by the square of the depth estimate (e.g. the subpixel depth value associated with the minimum of the fitted quadratic function). Although in this example a quadratic/parabolic function is used in other examples other appropriate functions may alternatively be fitted, depending on the nature of the images. Following calculation of the standard deviation in the depth domain, thresholding may be applied, wherein depth estimates with standard deviations above a given threshold are discarded (e.g. filtered out) for subsequent occupancy map determinations. In one case thresholding may be applied to retain a particular percentage of an image area (e.g. 50%). Following filtering of depth values, e.g. depth values associated with pixels of a reference image, a subset of the depth values remain, e.g. corresponding to a subset of said pixels, thus resulting in a "semi-dense" depth map, which is more reliable for free-space inference. In certain implementations, depths may be represented in inverse form and/or depth ranges may be sampled into a number of cost volume bins (e.g. 64 in one test example).

Depth maps as described above may form the basis for the processing at block 640 in FIG. 6. Using one or more depth maps the amount of free space area around a reference image camera pose may be inferred to populate the occupancy map. In one case, where the occupancy map is to be used to infer drivable or navigable free space for a relatively small robotic device (e.g. such as shown in FIGS. 1A, 1B, 2A and 2B), block 640 may start with column values below a horizon row. This may be useful in a case where free-space exists under a table or other over-hanging furniture. If no valid depth measurements are found below the horizon, column values above the horizon may then be examined, on the assumption that some vertical walls might be blank at camera height but have useful texture higher up. If no depth estimates survive standard deviation thresholding in an entire column then a default or fail-safe depth value may be selected (e.g. 0.5 m). If a default or fail-safe value is selected, then an associated area of the space may not be truly measured but the safe passage of the width of the robot plus some margin (e.g. as provided by local sensors) means that we can remove it from an occupancy map.

In a test case, graphical processing described herein was performed using a Compute Unified Device Architecture (CUDA) compatible graphical processing unit. The number of images in a sequence of images may vary, e.g. may be 30, 100 or 160 images. Certain test examples using variance filtering produced better results than comparative image gradient thresholding, wherein the latter was found to produce noisy output and leave horizontal edges where there is no real disparity for depth estimation. A variance filtering approach, on the other hand, better estimated areas that are closer to a camera device (with finer depth sampling in the cost volume) and exhibit vertical edges. Even in newly painted, empty rooms (e.g. lacking useful texture), test mappings uncovered over 50% of the free-space of the room from a single small circular motion.

In certain cases, multiple reference images may be selected for one or more movements. In these cases, multiple (filtered) depth maps may be generated based on these reference images. Each of these may then be integrated into a single occupancy map. In cases with multiple movements, a whole trajectory may be globally bundle adjusted to determine globally consistent poses, e.g. in relation to the sequences of images for all movements. This also allows free space information recovered at each movement location to be fused incrementally to eventually cover free-space for an entire room. In certain cases, movement may be repeated until a predefined amount of space has been uncovered. Certain examples described herein performed well in in real-world conditions and in comparison with LADAR systems, despite requiring equipment at a fraction of the cost. As such approaches discussed herein may be retrofitted into existing robotic devices that have cameras without the need for (substantial) hardware changes. Approaches described herein are runnable on low-cost embedded platforms and as such are suitable for use with small, low-cost robotic devices such as domestic robots. By being able to operate with (monocular) RGB cameras, examples herein may be used within practical cost, size, power and/or resolution constraints.

In certain cases, omni-directional cameras provide wide field of view coverage and ease of correspondence during extended movements, while the described examples minimise the effect of relatively low angular resolution and hard-to-calibrate projection characteristics that may be experienced when using such devices. Certain examples also overcome a challenge of implementing a working method using the unconventional geometry found with multi-directional cameras. Comparative methods have considered generating high-resolution panoramic images from multiple cameras, however these are less useful for navigation by robotic devices. In certain examples described herein, a feature-based matching and bundle adjustment procedure provides accurate estimates of the pose of each image. These are then used to construct an omnidirectional photoconsistency cost volume, e.g. based on 100-160 frames. The cost volume is used to generate an omnidirectional depth map which can be transformed into a dense three-dimensional vertex map. Certain examples described herein enable passive reconstruction indoors in spaces that have textureless areas, and minimises a problem of an omnidirectional depth map (and corresponding dense three-dimensional geometry estimates) having poorly-estimated areas where depth is unreliable, even when regularisation is applied. In these examples, depth standard deviation may be estimated from the cost volume data and a threshold applied to extract only semi-dense high-quality information. This procedure furthermore obviates the need for regularisation. For use in indoor navigation, this estimation may be followed by reduction to two dimensions and visibility reasoning, wherein the occupancy of cells in a two-dimensional regular grid may be estimated.

While certain comparative methods allow depth estimation, these typically require advanced hardware such as depth cameras, laser scanners or stereo vision systems. Certain examples described herein overcome a challenge of providing information for navigation using a standard RGB passive camera device. Moreover, most comparative methods are difficult, if not impossible, to implement in real-time and for embedded computing devices. In contrast, certain examples described herein provide accurate occupancy maps that may be used for real-time mapping and navigation.

Example Machine-Readable Instructions

Figure 10:
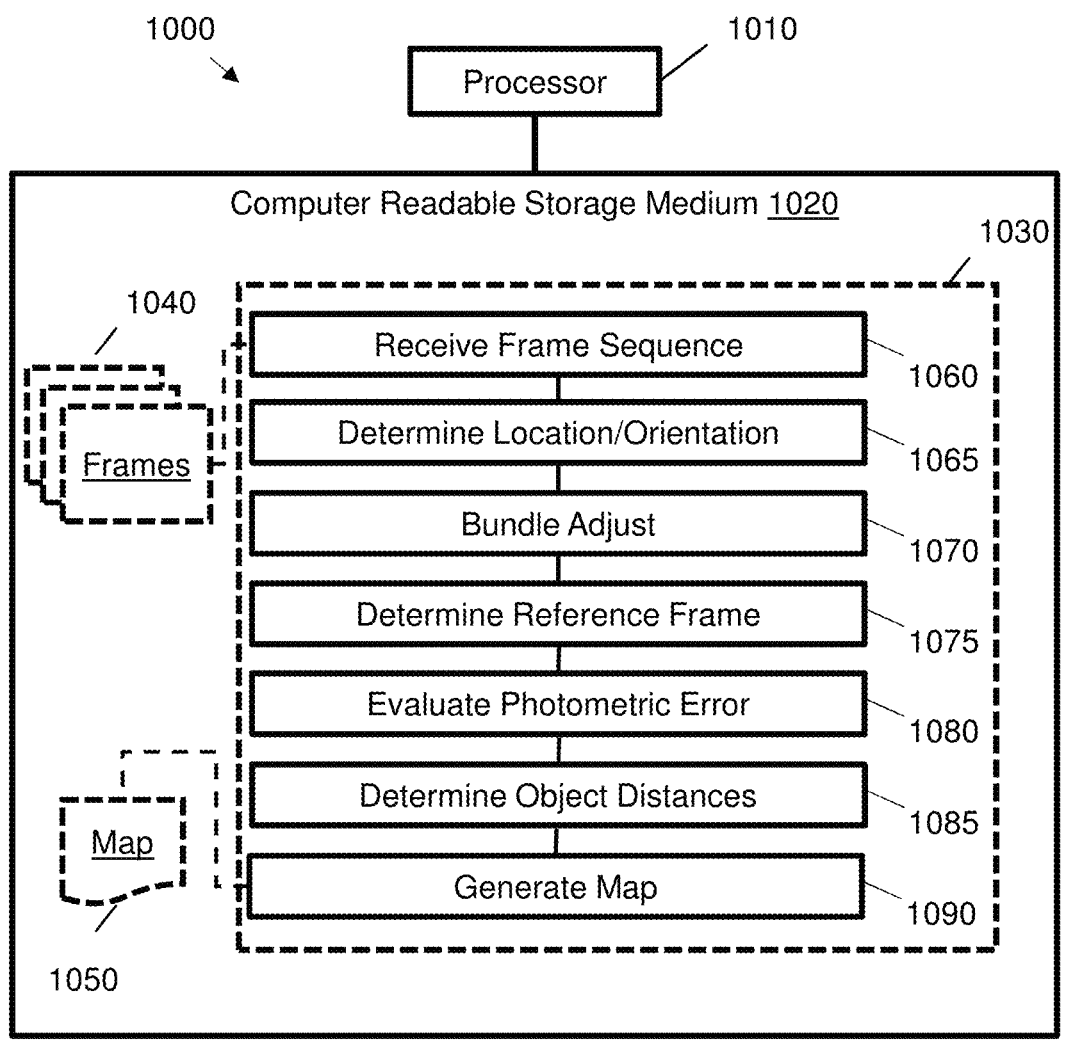
FIG. 10 is a schematic diagram showing a non-transitory computer readable medium according to an example.

Certain system components and methods described herein may be implemented by way of computer program code that is storable on a non-transitory storage medium. FIG. 10 shows a particular example 1000 of a system comprising at least one processor 1010 arranged to retrieve data from a computer-readable storage medium 1020. The system may comprise part of a mobile or robotic device as described above. The computer-readable storage medium 1020 comprises a set of computer-readable instructions 1030, stored thereon. The computer-readable storage medium 1020 in the present example is also configured to store frames of image data 1040 and an occupancy map 1050. The latter map 1050 may comprise an occupancy map such as that schematically illustrated in FIG. 3. In other examples, components 1030, 1040 and 1050 may be stored in separate mediums. In use, the at least one processor 1010 is configured to load the instructions 1030 into memory for processing. The instructions 1030 are arranged to cause the at least one processor 1010 to perform a series of actions. These actions comprise causing the processor to receive, at instruction 1060, a sequence of frames 1040 from a monocular multi-directional camera. In this example, the multi-directional camera is arranged to capture image data for each of the frames from a plurality of angular positions, the sequence of frames being captured at different angular positions within a plane of movement for a space. The actions further comprise causing the processor to determine, at instruction 1065, location and orientation estimates for the camera for each frame by matching detected features across the sequence of frames. Instruction 1070 then comprises bundle adjusting the location and orientation estimates for the camera and the detected features across the sequence of frames to generate an optimised set of location and orientation estimates for the camera.

Following bundle adjustment, instruction 1075 results in an action to determine a reference frame from the sequence of frames. Instruction 1080 then results in an action to evaluate a photometric error function between pixel values for the reference frame and projected pixel values from a set of comparison images that overlap the reference frame. In this case, said projected pixel values are a function of an object distance from the camera and the optimised set of location and orientation estimates for the camera. Via instruction 1085, the processor 1010 is configured to determine object distances for different angular positions corresponding to different pixel columns of the reference frame based on the evaluated photometric error function. Via instruction 1090, the processor then is instructed to generate a map of navigable areas within the plane of movement for space based on the determined object distances. As such, the machine-readable instructions 1030 may be used to perform certain examples described above, e.g. as part of firmware for a robotic device.

In certain cases, the monocular multi-directional camera comprises an omni-directional camera and each frame comprises an unwrapped omni-directional image. The omni-directional camera may comprise a panoramic-annular-lens. The sequence of frames may be received from a mobile video camera that is moved circumferentially within the space.

The above examples are to be understood as illustrative. Further examples are envisaged. In one case, the robotic device may comprise a depth sensor in additional to the (RGB) image sensor described in the examples above. The depth sensor may comprise part of the monocular multi-directional camera device. In this case, a sequence of frames may comprise image data and depth data. The depth data may then be used with the image data to estimate depth values, i.e. to determine object distances. For example, depth data may be used as an additional constraint within the volumetric function. The depth sensor may be used to provide a depth image or a point cloud as well as the described monocular images. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:
1. A robotic device comprising:
a monocular multi-directional camera device to capture an image from a plurality of angular positions;
at least one movement actuator to move the robotic device within a space;
a navigation engine to control movement of the robotic device within the space;
an occupancy map accessible by the navigation engine to determine navigable portions of the space,
wherein the navigation engine is configured to:
  instruct a movement of the robotic device around a point in a plane of movement using the at least one movement actuator;
  obtain, using the monocular multi-directional camera device, a sequence of images at a plurality of different angular positions during the instructed movement of the robotic device;
  determine pose data from the sequence of images, the pose data indicating the location and orientation of the monocular multi-directional camera device at a plurality of positions during the instructed movement, the pose data being determined using a set of features detected within the sequence of images;
  estimate depth values by evaluating a volumetric function of the sequence of images and the pose data, each depth value representing a distance from the multi-directional camera device to an object in the space; and
  process the depth values to populate the occupancy map for the space.

2. The robotic device of claim 1, comprising:
an image processor to unwrap images captured by the monocular multi-directional camera device and output panoramic images for use by the navigation engine.

3. The robotic device of claim 1, wherein the monocular multi-directional camera device comprises a video device to capture video data comprising a sequence of frames.

4. The robotic device of claim 1, wherein the occupancy map comprises a multi-dimensional grid, wherein entries in the grid indicate one of:
an area in the plane of movement comprises free space and the area is navigable by the robotic device, and
an area in the plane of movement comprises an object and the area is not navigable by the robotic device.

5. The robotic device of claim 1, comprising:
a camera calibrator to calibrate the monocular multi-directional camera device by processing at least one captured image of a calibration pattern,
the camera calibrator being configured to determine camera model parameters by evaluating a function of captured image values and retrieved calibration pattern image properties.

6. The robotic device of claim 1, wherein the monocular multi-directional camera device comprises an omni-directional camera.

7. The robotic device of claim 6, wherein the omni-directional camera comprises a panoramic-annular-lens.

8. The robotic device of claim 1, wherein the monocular multi-directional camera device comprises a depth sensor and an image sensor and is arranged to capture depth and image data.

9. The robotic device of claim 1, further comprising:
a cleaning element,
wherein the navigation engine is configured to:
  process the occupancy map to determine a cleaning pattern for unoccupied areas of the space, and
  instruct an activation of the cleaning element according to the cleaning pattern.

10. The robotic device of claim 9, wherein the cleaning element comprises a vacuum device.

11. A method for determining object occupancy for a space navigable by a robotic device comprising:
obtaining image data from a monocular multi-directional camera device coupled to the robotic device, the monocular multi-directional camera device being arranged to capture image data from a plurality of angular positions, the image data comprising a sequence of images having disparity within a plane of movement of the robotic device;
determining pose data corresponding to the image data, the pose data indicating the location and orientation of the monocular multi-directional camera device, the pose data being determined using a set of features detected within the image data;
estimating depth values by evaluating a volumetric function of the image data and the pose data, each depth value representing a distance from the monocular multi-directional camera device to an object in the space; and
processing the depth values to populate an object occupancy map for the space, the object occupancy map being useable by the robotic device to navigate the space.

12. The method of claim 11, wherein determining pose data corresponding to the image data comprises:
   detecting one or more features in each of a plurality of images in the sequence of images;
   matching the detected features across the plurality of images to determine a set of landmarks within the image data; and
   jointly optimising a set of camera pose estimates and a set of landmark location estimates for the sequence of images, the pose data comprising the set of camera pose estimates following joint optimisation.

13. The method of claim 12, wherein jointly optimising the set of camera and landmark location estimates comprises performing bundle adjustment.

14. The method of claim 12, wherein jointly optimising the set of camera and landmark location estimates comprises using odometry data from the robotic device to constrain an optimisation function.

15. The method of claim 11, wherein estimating depth values by evaluating a volumetric function comprises:
   determining a reference image from the sequence of images;
   determining a set of comparison images that overlap with the reference image;
   determining a photometric error between image values for the reference image and projected image values from the set of comparison images,
   wherein each projected image value comprises a projection of a comparison image to a viewpoint of the reference image using pose data for the reference image and pose data for the comparison image; and
   selecting depth values that minimise the photometric error.

16. The method of claim 15, wherein the photometric error is determined based on a normalised pixel photometric error.

17. The method of claim 15, wherein:
   the monocular multi-directional camera device comprises an omni-directional camera device and the reference image comprises a 360-degree panorama of the space, and
   wherein processing the depth values comprises:
   determining closest depth values for each pixel column of the reference image; and
   using said closest depth values to populate two-dimensional occupancy grid values.

18. The method claim 11, wherein estimating depth values comprises:
   determining variance measures for estimated depth values, and
   wherein processing the depth values comprises:
      filtering the estimated depth values based on the determined variance measures,
      wherein the object occupancy map is populated based on the filtered depth values.

19. The method of claim 18,
   wherein the variance measures comprise standard deviations for pixel depth measurements associated with a reference image, and
   wherein filtering the estimated depth values comprises using depth estimates that have a standard deviation value that is below a predefined threshold.

20. The method of claim 11, wherein estimating depth values comprises computing a semi-dense depth map of the space.

21. The method of claim 11, wherein:
   the method is repeated for multiple spaced circular movements of the robotic device within the space, and
   processing the depth values to populate the object occupancy map comprises integrating depth values from multiple depth maps to populate the object occupancy map.

22. The method of claim 11, further comprising:
   using the object occupancy map to determine a navigation path for the robotic device through unoccupied areas of the space.

23. The method of claim 11, wherein the robotic device comprises a cleaning element and the method comprises:
   using the object occupancy map to determine a cleaning pattern for unoccupied areas of the space,
   wherein the cleaning pattern indicates where the cleaning element is to be applied within the space.

24. A non-transitory computer-readable storage medium comprising computer-executable instructions which, when executed by a processor, cause a computing device to map a space, wherein the instructions cause the computing device to:
   receive a sequence of frames from a monocular multi-directional camera, the multi-directional camera being arranged to capture image data for each of the frames from a plurality of angular positions, the sequence of frames being captured at different angular positions within a plane of movement for the space;
   determine location and orientation estimates for the camera for each frame by matching detected features across the sequence of frames;
   bundle adjust the location and orientation estimates for the camera and the detected features across the sequence of frames to generate an optimised set of location and orientation estimates for the camera;
   determine a reference frame from the sequence of frames;
   evaluate a photometric error function between pixel values for the reference frame and projected pixel values from a set of comparison images that overlap the reference frame, said projected pixel values being a function of an object distance from the camera and the optimised set of location and orientation estimates for the camera;
   determine object distances for different angular positions corresponding to different pixel columns of the reference frame based on the evaluated photometric error function; and
   generate a map of navigable areas within the plane of movement for the space based on the determined object distances.

25. The medium of claim 24, wherein:
   the monocular multi-directional camera comprises an omni-directional camera; and
   each frame comprises an unwrapped omni-directional image.

26. The medium of claim 25, wherein the omni-directional camera comprises a panoramic-annular-lens.

27. The medium of claim 24, wherein the sequence of frames are received from a mobile video camera that is moved circumferentially within the space.

28. The medium of claim 24, wherein the monocular multi-directional camera comprises an image sensor and a depth sensor and wherein the sequence of frames comprise image data and depth data, the depth data being used with the image data to determine object distances.

* * * * *